(12) United States Patent
Counter et al.

(10) Patent No.: US 8,920,768 B2
(45) Date of Patent: Dec. 30, 2014

(54) CRYSTALLIZATION AIDS FOR BAYER ALUMINUM HYDROXIDE

(71) Applicant: Ecolab USA Inc., St. Paul, MN (US)

(72) Inventors: James Counter, Thirroul (AU); John T. Malito, Huntsville, AP (US)

(73) Assignee: Ecolab USA Inc., St. Paul, MN (US)

( * ) Notice: Subject to any disclaimer, the term of this patent is extended or adjusted under 35 U.S.C. 154(b) by 27 days.

(21) Appl. No.: 13/829,950

(22) Filed: Mar. 14, 2013

(65) Prior Publication Data

US 2014/0271417 A1    Sep. 18, 2014

(51) Int. Cl.
   *C01F 7/00*    (2006.01)
   *C01F 7/14*    (2006.01)

(52) U.S. Cl.
   CPC ..................................... *C01F 7/145* (2013.01)
   USPC ........................... 423/629; 423/127; 423/625

(58) Field of Classification Search
   None
   See application file for complete search history.

(56) References Cited

U.S. PATENT DOCUMENTS

| | | | |
|---|---|---|---|
| 4,737,352 | A | 4/1988 | Owen et al. |
| 5,106,599 | A | 4/1992 | Roe |
| 6,527,959 | B1 * | 3/2003 | Quadir et al. ................ 210/727 |
| 2006/0292050 | A1 | 12/2006 | Malito et al. |
| 2007/0081932 | A1 | 4/2007 | Liu et al. |

FOREIGN PATENT DOCUMENTS

| | | |
|---|---|---|
| CN | 102107127 A | 6/2011 |
| DE | 4039053 | 6/1992 |
| EP | 0 032 008 A2 | 7/1981 |
| EP | 0602900 | 6/1994 |

OTHER PUBLICATIONS

Smith, P.G. et al., "The effects of model organic compounds on gibbsite crystallization from alkaline aluminate solutions: polyols," Colloids and Surfaces, A: Physicochemical and Engineering Aspects, 111, (1996), pp. 119-130.
Watling, H. et al., "Gibbsite crystallization inhibition 1. Effects of sodium gluconate on nucleation, agglomeration and growth," Hydrometallurgy, 55, (2000), pp. 275-288.
Nikolić, I. et al., "Influence of oxalic acid on the kinetics of Al(OH)3 growth fom caustic soda solutions," Hydrometallurgy, 74, (2004), pp. 1-9.
Seyssiecq, I. et al., "The influence of additives on the crystal habit of gibbsite," Journal of Crystal Growth, 196, (1999), pp. 174-180.
Tran, T. et al., "The effect of 3,4 dihyrdoxy benzoic acide (3,4 DHBA) on the precipitation of alumina trihydrate," Minerals Engineering, vol. 9, No. 5, 1996, pp. 557-572.
Paulaime, A. et al., "The influence of organic additives on the crystallization and agglomeration of gibbsite," Powder Technology, 130, (2003), pp. 345-351.
Rasmussen, D. et al., "Precipitaton of nanoscale aluminum hydroxide particles," Journal of Dispersion Science and Technology, 22(5), 2001, pp. 491-498.
Alamdari, A. et al., "Poisoning of the precipitation of alumina trihydrate by mannitol," Light Metals, 1993, pp. 143-149.
Yanly, X. et al., "Study on the application and mechanism of cationic surfactant on the precipitation of soduim aluminate liquor," Light Metals, 2001, pp. 135-137.
Zhao et al., "Effect of Anionic Surfactant on Decomposition of Sodium Aluminate Solution," Journal of Northeastern University Natural Science, 25 (2), 2004, pp. 139-141, (English Abstract Only).
Zhao et al., Effect of Additives on Particle Size and Strength of Aluminum Hydroxide Decomposed with Seed Crystal Used, Journal of Northeastern University Natural Science, 24 (10), 2003, pp. 939-941, (English Abstract Only).
Alonso, M. V., et al., "Thermal Degradation of Lignin-phenol-formaldehyde and Phenol-formaldehyde Resol Resins," Journal of Thermal Analysis and Calorimetry, 2011, pp. 349-356, vol. 105.
International Search Report and Written Opinion issued for PCT/US2014/016095, dated Jun. 13, 2014, 7 pages.

* cited by examiner

*Primary Examiner* — Steven Bos
(74) *Attorney, Agent, or Firm* — Senniger Powers LLP

(57) ABSTRACT

Disclosed herein are compounds, compositions, and methods for producing aluminum hydroxide crystals from a precipitation liquor. The precipitation liquor may be located in a Bayer process.

24 Claims, No Drawings

CRYSTALLIZATION AIDS FOR BAYER ALUMINUM HYDROXIDE

TECHNICAL FIELD

The present disclosure relates generally to compounds, compositions, and methods that improve recovery of aluminum values from aluminum hydroxide production processes such as the Bayer process, and more particularly, to compounds and compositions that increase particle size of aluminum hydroxide crystals, or crystalline aggregates.

BACKGROUND

Aluminum hydroxide is produced on an industrial scale by well-established methods such as the Bayer process. The precipitation process operators optimize their methods so as to produce the greatest possible yield from the aluminate process liquors while trying to achieve a particular crystal size distribution of aluminum hydroxide product. It is desirable in most instances to obtain the product of relatively large crystal size and to correspondingly limit the amount of very fine crystals, since this is beneficial in subsequent processing steps required to produce aluminum metal. Production is often limited by processing conditions under which the crystallization and precipitation is conducted. These processing conditions vary from one plant to the next and include, but are not limited to, temperature profiles, seed charge, seed crystal surface area, purge of carbon dioxide or flue gases, liquor loading, liquor purity, and the like.

Extensive efforts have been invested into finding chemical additives and methods limiting the factors negatively affecting particle size in order to achieve the optimal economic recovery of aluminum hydroxide product. Despite the continuous and ongoing development worldwide, the industry demands for more economical resolution of the above-described process needs remain.

SUMMARY

Disclosed herein is a method of increasing the particle size of aluminum hydroxide crystals precipitated from a Bayer process liquor, the method including adding to the Bayer process liquor a composition comprising a phenolic-aldehyde condensate; and recovering aluminum hydroxide crystals precipitated from the Bayer process liquor.

In certain embodiments, the phenolic-aldehyde condensate comprises repeating units of formula (I),

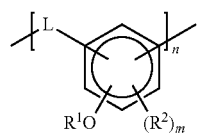
(I)

wherein, $R^1$, at each occurrence, is independently selected from the group consisting of hydrogen, alkyl, alkenyl, alkynyl, aryl, heteroaryl, heterocyclyl, and cycloalkyl;

$R^2$, at each occurrence, is independently selected from the group consisting of alkyl, alkenyl, alkynyl, aryl, heteroaryl, heterocyclyl, cycloalkyl, halogen, cyano, nitro, and $-OR^3$;

$R^3$, at each occurrence, is independently selected from the group consisting of hydrogen, alkyl, alkenyl, alkynyl, aryl, heteroaryl, heterocyclyl, and cycloalkyl;

L is $-C(R^a)(R^b)-$ or $-O-C(R^c)(R^d)-$; $R^a$, $R^b$, $R^c$, and $R^d$ are, at each occurrence, independently selected from the group consisting of hydrogen, alkyl, alkenyl, alkynyl, aryl, heteroaryl, heterocyclyl, and cycloalkyl;

m, at each occurrence, is an integer independently selected from the group consisting of 0, 1, 2, and 3; and n is $\geq 1$;

wherein said alkyl, alkenyl, alkynyl, aryl, heteroaryl, heterocyclyl, and cycloalkyl are each independently, at each occurrence, substituted or unsubstituted with one or more suitable substituents.

In certain embodiments, the phenolic-aldehyde repeating units have formula (I-a),

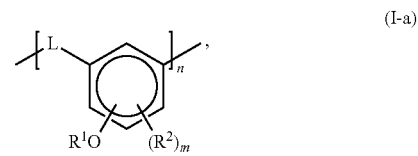
(I-a)

wherein $R^1$, $R^2$, L, m, and n are as defined above.

In certain embodiments, the phenolic-aldehyde repeating units have formula (I-b),

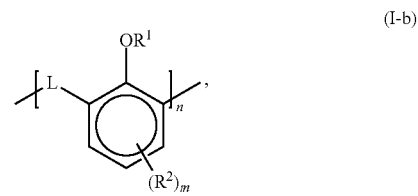
(I-b)

wherein $R^1$, $R^2$, L, m, and n are as defined above.

In certain embodiments, the phenolic-aldehyde repeating units have formula (I-c),

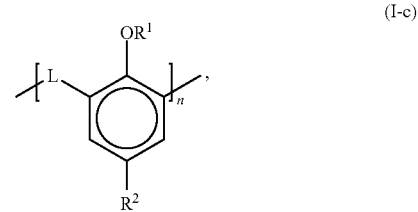
(I-c)

wherein $R^1$, $R^2$, L, and n are as defined above.

In certain embodiments, the phenolic-aldehyde condensate comprises repeating units of formula (I), wherein $R^1$ is hydrogen at each occurrence; and $R^2$, at each occurrence, is independently selected from $-OH$ and $C_1$-$C_8$ substituted or unsubstituted alkyl. In certain embodiments L is $-CH_2-$ at each occurrence. In certain embodiments, L is $-O-CH_2-$ at each occurrence.

In certain embodiments, the phenolic-aldehyde condensate has formula (II),

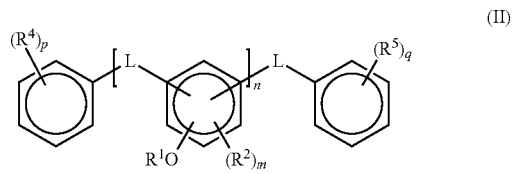
(II)

wherein,

R¹, at each occurrence, is independently selected from the group consisting of hydrogen, alkyl, alkenyl, alkynyl, aryl, heteroaryl, heterocyclyl, and cycloalkyl;

R², at each occurrence, is independently selected from the group consisting of alkyl, alkenyl, alkynyl, aryl, heteroaryl, heterocyclyl, cycloalkyl, halogen, cyano, nitro, and —OR³;

R³, at each occurrence, is independently selected from the group consisting of hydrogen, alkyl, alkenyl, alkynyl, aryl, heteroaryl, heterocyclyl, and cycloalkyl;

R⁴, at each occurrence, is independently selected from the group consisting of alkyl, alkenyl, alkynyl, aryl, heteroaryl, heterocyclyl, cycloalkyl, halogen, cyano, nitro, and —OR⁶;

R⁵, at each occurrence, is independently selected from the group consisting of alkyl, alkenyl, alkynyl, aryl, heteroaryl, heterocyclyl, cycloalkyl, halogen, cyano, nitro, and —OR⁷;

R⁶ and R⁷, at each occurrence, are each independently selected from the group consisting of hydrogen, alkyl, alkenyl, alkynyl, aryl, heteroaryl, heterocyclyl, and cycloalkyl;

L is —C(Rᵃ)(Rᵇ)— or —O—C(Rᶜ)(Rᵈ)—;

Rᵃ, Rᵇ, Rᶜ, and Rᵈ are, at each occurrence, are each independently selected from the group consisting of hydrogen, alkyl, alkenyl, alkynyl, aryl, heteroaryl, heterocyclyl, and cycloalkyl;

m, at each occurrence, is an integer independently selected from the group consisting of 0, 1, 2, and 3;

n is ≥1;

p is 1, 2, 3, 4, or 5; and q is 1, 2, 3, 4, or 5;

wherein said alkyl, alkenyl, alkynyl, aryl, heteroaryl, heterocyclyl, and cycloalkyl are each independently, at each occurrence, substituted or unsubstituted with one or more suitable substituents.

In certain embodiments, the phenolic-aldehyde condensate has formula (II-a),

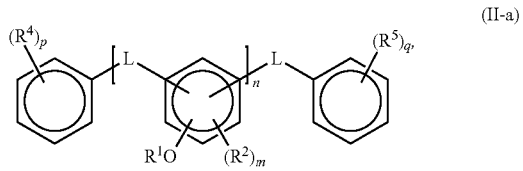

(II-a)

wherein R¹, R², R⁴, R⁵, L, m, n, p, and q are as defined above.

In certain embodiments, the phenolic-aldehyde condensate has formula (II-b),

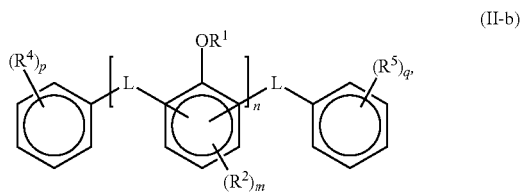

(II-b)

wherein R¹, R², R⁴, R⁵, L, m, n, p, and q are as defined above.

In certain embodiments, the phenolic-aldehyde condensate has formula (II-c),

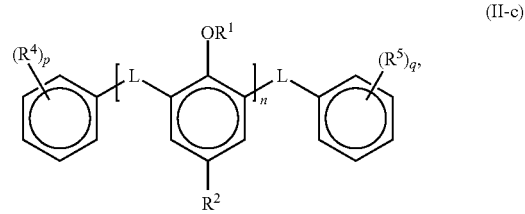

(II-c)

wherein R¹, R², R⁴, R⁵, L, n, p, and q are as defined above.

In certain embodiments, the phenolic-aldehyde condensate has formula (II), wherein R¹ is hydrogen at each occurrence; R², at each occurrence, is independently selected from —OH and C₁-C₈ substituted or unsubstituted alkyl; p is 1 or 2 wherein at least one R⁴ is —OH and the other optional R⁴ is selected from —OH and C₁-C₈ substituted or unsubstituted alkyl; and q is 1 or 2 wherein at least one R⁵ is —OH and the other optional R⁵ is selected from —OH and C₁-C₈ substituted or unsubstituted alkyl. In certain embodiments, L is —CH₂— at each occurrence. In certain embodiments, L is —O—CH₂— at each occurrence.

In certain embodiments, the phenolic-aldehyde condensate is selected from the group consisting of: a butylphenol formaldehyde resin formed under acidic conditions; a butylphenol formaldehyde resin formed under basic conditions; a resorcinol formaldehyde resin formed under acidic conditions; a resorcinol formaldehyde resin formed under basic conditions; a phenol formaldehyde resin formed under acidic conditions; a phenol formaldehyde resin formed under basic conditions; a cresol formaldehyde resin formed under acidic conditions; a cresol formaldehyde resin formed under basic conditions; an octylphenol formaldehyde resin formed under acidic conditions; and an octylphenol formaldehyde resin formed under basic conditions.

In certain embodiments, the composition further comprises a solvent selected from the group consisting of ethoxylated and propoxylated alkyl ethers or alcohols, fatty acid esters, low aromatic hydrocarbon oils, kerosene, heavy aromatic naphtha ("HAN"), propylene glycol monomethyl ether, n-butanol, isobutanol, and combinations thereof.

In certain embodiments, the composition is selected from the group consisting of: a composition of a butylphenol formaldehyde resin formed under acidic conditions, and an ethoxylated and propoxylated alkyl ether; a composition of a butylphenol formaldehyde resin formed under acidic conditions, and kerosene; a composition of a butylphenol formaldehyde resin formed under basic conditions, and an ethoxylated and propoxylated alkyl ether; a composition of a butylphenol formaldehyde resin formed under basic conditions, and kerosene; a composition of a resorcinol formaldehyde resin, and a sodium hydroxide solution; a composition of a phenol formaldehyde resin formed under acidic conditions, and an ethoxylated and propoxylated alkyl ether; a composition of a cresol formaldehyde resin formed under basic conditions, propylene glycol monomethyl ether, n-butanol, and isobutanol; and a composition of an octylphenol formaldehyde resin formed under acidic conditions, and kerosene.

In certain embodiments, at least half of the recovered aluminum hydroxide crystals by weight exceed 44-45 microns in size.

In certain embodiments, the method provides a % increase in mean of control quantile size of at least 20%.

The compounds, compositions, methods and processes are further described herein.

DETAILED DESCRIPTION

Disclosed herein are compounds and compositions that act as crystallization aids, also referred to as crystal growth modifiers. Also disclosed herein are methods of crystallization using the compounds and compositions. The compounds, compositions, and methods provide for the production of aluminum hydroxide having a significantly larger particle size than otherwise possible, and superior to that of existing crystallization aids. As a consequence, alumina refineries can be operated under conditions that will significantly boost yield while still satisfying particle size constraints.

The compounds, compositions, and methods are also applicable to modification of the precipitation of sodium oxalate in the Bayer process; as well as to crystal growth modification for carbonate scale, gypsum, nickel hydroxide (lateritic nickel process), and trona (sodium carbonate), among others.

1. DEFINITION OF TERMS

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The present disclosure also contemplates other embodiments "comprising," "consisting of" and "consisting essentially of," the embodiments or elements presented herein, whether explicitly set forth or not.

The term "suitable substituent," as used herein, is intended to mean a chemically acceptable functional group, preferably a moiety that does not negate the activity of the inventive compounds. Such suitable substituents include, but are not limited to halo groups, perfluoroalkyl groups, perfluoroalkoxy groups, alkyl groups, alkenyl groups, alkynyl groups, hydroxy groups, oxo groups, mercapto groups, alkylthio groups, alkoxy groups, aryl or heteroaryl groups, aryloxy or heteroaryloxy groups, aralkyl or heteroaralkyl groups, aralkoxy or heteroaralkoxy groups, HO—(C=O)— groups, heterocylic groups, cycloalkyl groups, amino groups, alkyl- and dialkylamino groups, carbamoyl groups, alkylcarbonyl groups, alkoxycarbonyl groups, alkylaminocarbonyl groups, dialkylamino carbonyl groups, arylcarbonyl groups, aryloxycarbonyl groups, alkylsulfonyl groups, arylsulfonyl groups and the like. Those skilled in the art will appreciate that many substituents can be substituted by additional substituents.

The term "alkyl," as used herein, refers to a linear or branched hydrocarbon radical, preferably having 1, 2, 3, 4, 5, 6, 7, 8, 9, 10, 11, 12, 13, 14, 15, 16, 17, 18, 19, 20, 21, 22, 23, 24, 25, 26, 27, 28, 39, 30, 31, or 32 carbons. Alkyl groups include, but are not limited to, methyl, ethyl, n-propyl, iso-propyl, n-butyl, iso-butyl, secondary-butyl, and tertiary-butyl. Alkyl groups may be unsubstituted or substituted by one or more suitable substituents, as defined above.

The term "alkenyl," as used herein, refers to a straight or branched hydrocarbon radical, preferably having 1, 2, 3, 4, 5, 6, 7, 8, 9, 10, 11, 12, 13, 14, 15, 16, 17, 18, 19, 20, 21, 22, 23, 24, 25, 26, 27, 28, 39, 30, 31, or 32 carbons, and having one or more carbon-carbon double bonds. Alkenyl groups include, but are not limited to, ethenyl, 1-propenyl, 2-propenyl (allyl), iso-propenyl, 2-methyl-1-propenyl, 1-butenyl, and 2-butenyl. Alkenyl groups may be unsubstituted or substituted by one or more suitable substituents, as defined above.

The term "alkynyl," as used herein, refers to a straight or branched hydrocarbon radical, preferably having 1, 2, 3, 4, 5, 6, 7, 8, 9, 10, 11, 12, 13, 14, 15, 16, 17, 18, 19, 20, 21, 22, 23, 24, 25, 26, 27, 28, 39, 30, 31, or 32 carbons, and having one or more carbon-carbon triple bonds. Alkynyl groups include, but are not limited to, ethynyl, propynyl, and butynyl. Alkynyl groups may be unsubstituted or substituted by one or more suitable substituents, as defined above.

The term "alkoxy," as used herein, refers to an alkyl group, as defined herein, appended to the parent molecular moiety through an oxygen atom.

The term "aryl," as used herein, means monocyclic, bicyclic, or tricyclic aromatic radicals such as phenyl, naphthyl, tetrahydronaphthyl, indanyl and the like; optionally substituted by one or more suitable substituents, preferably 1 to 5 suitable substituents, as defined above.

The term "carbonyl," "(C=O)," or "—C(O)—" (as used in phrases such as alkylcarbonyl, alkyl —(C=O)— or alkoxycarbonyl) refers to the joinder of the >C=O moiety to a second moiety such as an alkyl or amino group (i.e. an amido group). Alkoxycarbonylamino (i.e. alkoxy(C=O)—NH—) refers to an alkyl carbamate group. The carbonyl group is also equivalently defined herein as (C=O). Alkylcarbonylamino refers to groups such as acetamide.

The term "cycloalkyl," as used herein, refers to a mono, bicyclic or tricyclic carbocyclic radical (e.g., cyclopropyl, cyclobutyl, cyclopentyl, cyclohexyl, cycloheptyl, cyclooctyl, cyclononyl, cyclopentenyl, cyclohexenyl, bicyclo[2.2.1]heptanyl, bicyclo[3.2.1]octanyl and bicyclo[5.2.0]nonanyl, etc.); optionally containing 1 or 2 double bonds. Cycloalkyl groups may be unsubstituted or substituted by one or more suitable substituents, preferably 1 to 5 suitable substituents, as defined above.

The term "halo" or "halogen," as used herein, refers to a fluoro, chloro, bromo or iodo radical.

The term "heteroaryl," as used herein, refers to a monocyclic, bicyclic, or tricyclic aromatic heterocyclic group containing one or more heteroatoms selected from O, S and N in the ring(s). Heteroaryl groups include, but are not limited to, pyridyl, pyrazinyl, pyrimidinyl, pyridazinyl, thienyl, furyl, imidazolyl, pyrrolyl, oxazolyl (e.g., 1,3-oxazolyl, 1,2-oxazolyl), thiazolyl (e.g., 1,2-thiazolyl, 1,3-thiazolyl), pyrazolyl, tetrazolyl, triazolyl (e.g., 1,2,3-triazolyl, 1,2,4-triazolyl), oxadiazolyl (e.g., 1,2,3-oxadiazolyl), thiadiazolyl (e.g., 1,3,4-thiadiazolyl), quinolyl, isoquinolyl, benzothienyl, benzofuryl, and indolyl. Heteroaryl groups may be unsubstituted or substituted by one or more suitable substituents, preferably 1 to 5 suitable substituents, as defined above.

The terms "heterocycle" or "heterocyclyl," as used herein, refer to a monocyclic, bicyclic, or tricyclic group containing 1 to 4 heteroatoms selected from N, O, $S(O)_n$, NH or $NR^x$, wherein Rx is a suitable substituent. Heterocyclic groups optionally contain 1 or 2 double bonds. Heterocyclic groups include, but are not limited to, azetidinyl, tetrahydrofuranyl, imidazolidinyl, pyrrolidinyl, piperidinyl, piperazinyl, oxazolidinyl, thiazolidinyl, pyrazolidinyl, thiomorpholinyl, tetrahydrothiazinyl, tetrahydro-thiadiazinyl, morpholinyl, oxetanyl, tetrahydrodiazinyl, oxazinyl, oxathiazinyl, indolinyl, isoindolinyl, quinuclidinyl, chromanyl, isochromanyl, and benzoxazinyl. Examples of monocyclic saturated or partially saturated ring systems are tetrahydrofuran-2-yl, tetrahydrofuran-3-yl, imidazolidin-1-yl, imidazolidin-2-yl, imidazolidin-4-yl, pyrrolidin-1-yl, pyrrolidin-2-yl, pyrrolidin-3-yl, piperidin-1-yl, piperidin-2-yl, piperidin-3-yl, piperazin-1-yl, piperazin-2-yl, piperazin-3-yl, 1,3-oxazolidin-3-yl, isothiazolidine, 1,3-thiazolidin-3-yl, 1,2-pyrazolidin-2-yl, 1,3-pyrazolidin-1-yl, thiomorpholin-yl, 1,2-tetrahydrothiazin-2-yl, 1,3-tetrahydrothiazin-3-yl, tetrahydrothiadiazin-yl, morpholin-yl, 1,2-tetrahydrodiazin-2-yl, 1,3-tetrahydrodiazin-1-yl, 1,4-oxazin-2-yl, and 1,2,5-oxathiazin-4-yl. Heterocyclic groups may be unsubstituted or substituted by one or more suitable substituents, preferably 1 to 3 suitable substituents, as defined above.

The term "hydroxy," as used herein, refers to an —OH group.

The term "oxo," as used herein, refers to a double bonded oxygen (=O) radical wherein the bond partner is a carbon atom. Such a radical can also be thought as a carbonyl group.

The term "A/C," as used herein, refers to the alumina to caustic ratio.

The term "BET," as used herein, refers to the Brunauer-Emmett-Teller method for experimental determination of surface area. The method employs the analysis of adsorption isotherm of nitrogen or other gases on the material.

The term "CGM," as used herein, refers to a crystal growth modifier.

The term "precipitation liquor," as used herein, refers to an aluminate containing liquor in an aluminum hydroxide precipitation step of an alumina production process. The aluminate liquor may be referred to as various terms known to those of ordinary skill in the art, for example, pregnant liquor, green liquor, and aluminum hydroxide precipitation feed. The term "precipitation liquor" may also include the aluminate solution directed to decomposition in a sintering-carbonate process or combined Bayer-sintering process as accomplished by methods known to those skilled in the art.

The term "precipitation feed liquor," as used herein, refers to the precipitation liquor that flows into a precipitator of an aluminum hydroxide precipitation process.

The term "heated precipitation liquor," as used herein, refers to any liquor within the aluminum hydroxide production process having a free alkalinity level above 50 g/L of $Na_2CO_3$ and a temperature above ambient or 25° C.

The term "spent liquor," as used herein, refers to the liquor resulting from the removal of precipitated aluminum values, such as the spent liquor after the final classification stage that returns back to digestion to the Bayer process.

2. COMPOUNDS

Compounds of the invention include phenolic-aldehyde condensates. The phenolic-aldehyde condensates may serve as crystal growth modifiers to aid crystallization of aluminum hydroxide from a precipitation liquor, such as found in a Bayer process.

In one aspect, disclosed herein are phenolic-aldehyde condensates having repeating units of formula (I),

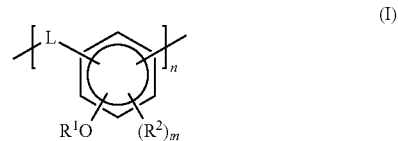

(I)

wherein, $R^1$, at each occurrence, is independently selected from the group consisting of hydrogen, alkyl, alkenyl, alkynyl, aryl, heteroaryl, heterocyclyl, and cycloalkyl;

$R^2$, at each occurrence, is independently selected from the group consisting of alkyl, alkenyl, alkynyl, aryl, heteroaryl, heterocyclyl, cycloalkyl, halogen, cyano, nitro, and —$OR^3$;

$R^3$, at each occurrence, is independently selected from the group consisting of hydrogen, alkyl, alkenyl, alkynyl, aryl, heteroaryl, heterocyclyl, and cycloalkyl;

L is —$C(R^a)(R^b)$— or —O—$C(R^c)(R^d)$—;

$R^a$, $R^b$, $R^c$, and $R^d$ are, at each occurrence, independently selected from the group consisting of hydrogen, alkyl, alkenyl, alkynyl, aryl, heteroaryl, heterocyclyl, and cycloalkyl;

m, at each occurrence, is an integer independently selected from the group consisting of 0, 1, 2, and 3; and n is ≥1;

wherein said alkyl, alkenyl, alkynyl, aryl, heteroaryl, heterocyclyl, and cycloalkyl are each independently, at each occurrence, substituted or unsubstituted with one or more suitable substituents.

In certain embodiments, $R^1$ is hydrogen at each occurrence.

In certain embodiments, $R^1$, at each occurrence, is selected from hydrogen and substituted or unsubstituted alkyl. In certain embodiments, $R^1$, at each occurrence, is selected from hydrogen and substituted or unsubstituted linear $C_1$-$C_{30}$ alkyl, $C_1$-$C_{18}$ alkyl, or $C_1$-$C_8$ alkyl. In certain embodiments, $R^1$, at each occurrence, is selected from hydrogen and substituted or unsubstituted branched $C_1$-$C_{30}$ alkyl, $C_1$-$C_{18}$ alkyl, or $C_1$-$C_8$ alkyl. In certain embodiments, $R^1$, at each occurrence, is selected from hydrogen, methyl, ethyl, propyl (e.g., n-propyl, isopropyl), butyl (e.g., n-butyl, isobutyl, tert-butyl, sec-butyl), pentyl (e.g., n-pentyl, isopentyl, tert-pentyl, neopentyl, sec-pentyl, 3-pentyl), hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, and triacontyl.

In certain embodiments, $R^2$, at each occurrence, is selected from —$OR^3$ and substituted or unsubstituted alkyl. In certain embodiments, $R^2$, at each occurrence, is selected from —$OR^3$ and substituted or unsubstituted linear $C_1$-$C_{30}$ alkyl, $C_1$-$C_{18}$ alkyl, or $C_1$-$C_8$ alkyl. In certain embodiments, $R^2$, at each occurrence, is selected from —$OR^3$ and substituted or unsubstituted branched $C_1$-$C_{30}$ alkyl, $C_1$-$C_{18}$ alkyl, or $C_1$-$C_8$ alkyl. In certain embodiments, $R^2$, at each occurrence, is selected from —$OR^3$, methyl, ethyl, propyl (e.g., n-propyl, isopropyl), butyl (e.g., n-butyl, isobutyl, tert-butyl, sec-butyl), pentyl (e.g., n-pentyl, isopentyl, tert-pentyl, neopentyl, sec-pentyl, 3-pentyl), hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, and triacontyl.

In certain embodiments, $R^3$ is hydrogen at each occurrence.

In certain embodiments, L is —C($R^a$)($R^b$)—. In certain embodiments, $R^a$ and $R^b$ are each independently, at each occurrence, hydrogen such that L is —CH$_2$—. In certain embodiments, $R^a$ and $R^b$ are each independently, at each occurrence, selected from hydrogen and substituted or unsubstituted linear $C_1$-$C_{18}$ alkyl. In certain embodiments, $R^a$ and $R^b$ are each independently, at each occurrence, selected from hydrogen and substituted or unsubstituted branched $C_1$-$C_{18}$ alkyl. In certain embodiments, $R^a$ and $R^b$ are each independently, at each occurrence, selected from hydrogen, methyl, ethyl, propyl (e.g., n-propyl, isopropyl), butyl (e.g., n-butyl, isobutyl, tert-butyl, sec-butyl), pentyl (e.g., n-pentyl, isopentyl, tert-pentyl, neopentyl, sec-pentyl, 3-pentyl), hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, and triacontyl. In certain embodiments, $R^a$ and $R^b$ are each independently, at each occurrence, selected from hydrogen and substituted or unsubstituted phenyl, dihydroindenyl, indenyl, naphthyl, dihydronaphthalenyl, or 5,6,7,8-tetrahydronaphthalenyl. In certain embodiments, $R^a$ and $R^b$ are each independently, at each occurrence, selected from hydrogen and substituted or unsubstituted cyclopropyl, cyclobutyl, cyclopentyl, cyclohexyl, cycloheptyl, cyclooctyl, cyclononyl, cyclodecyl, cycloundecyl, cyclododecyl, cyclotridecyl, cyclotetradecyl, cyclopentadecyl, cyclohexadecyl, cycloheptadecyl, or cyclooctodecyl. In certain embodiments, $R^a$ and $R^b$ are each independently, at each occurrence, selected from hydrogen and substituted or unsubstituted furanyl, imidazolyl, isoxazolyl, isothiazolyl, oxadiazolyl, oxazolyl, pyridinyl, pyridazinyl, pyrimidinyl, pyrazinyl, pyrazolyl, pyrrolyl, tetrazolyl, thiadiazolyl, thiazolyl, thienyl, triazolyl, triazinyl, benzofuranyl, benzothienyl, 1,3-benzoxazolyl, benzimidazolyl, indazolyl, indolyl, isoindolyl, isoquinolinyl, naphthyridinyl, pyridoimidazolyl, or quinolinyl. In certain embodiments, $R^a$ and $R^b$ are each independently, at each occurrence, selected from hydrogen and substituted or unsubstituted azetidinyl, azepanyl, aziridinyl, diazepanyl, 1,3-dioxanyl, 1,3-dioxolanyl, 1,3-dithiolanyl, 1,3-dithianyl, imidazolinyl, imidazolidinyl, isothiazolinyl, isothiazolidinyl, isoxazolinyl, isoxazolidinyl, morpholinyl, oxadiazolinyl, oxadiazolidinyl, oxazolinyl, oxazolidinyl, piperazinyl, piperidinyl, pyranyl, pyrazolinyl, pyrazolidinyl, pyrrolinyl, pyrrolidinyl, tetrahydrofuranyl, tetrahydrothienyl, thiadiazolinyl, thiadiazolidinyl, thiazolinyl, thiazolidinyl, 1,3-thiazolidinyl, thiomorpholinyl, 1,1-dioxidothiomorpholinyl, thiopyranyl, trithianyl, 1,3-benzodithiolyl, benzopyranyl, benzothiopyranyl, 2,3-dihydrobenzofuranyl, 2,3-dihydrobenzothienyl, 2,3-dihydro-1H-indolyl, 2,3-dihydroisoindol-2-yl, 2,3-dihydroisoindol-3-yl, 1,3-dixo-1H-isoindolyl, 5,6-dihydroimidazo-[1,2-a]pyrazin-7(8H)-yl, 1,2,3,4-tetrahydroisoquinolin-2-yl, or 1,2,3,4-tetrahydroquinolinyl.

In certain embodiments, L is —O—C($R^c$)($R^d$)—. In certain embodiments, $R^c$ and $R^d$ are each hydrogen such that L is —O—CH$_2$—. In certain embodiments, $R^c$ and $R^d$ are each independently, at each occurrence, selected from hydrogen and substituted or unsubstituted linear $C_1$-$C_{18}$ alkyl. In certain embodiments, $R^c$ and $R^d$ are each independently, at each occurrence, selected from hydrogen and substituted or unsubstituted branched $C_1$-$C_{18}$ alkyl. In certain embodiments, $R^c$ and $R^d$ are each independently, at each occurrence, selected from hydrogen, methyl, ethyl, propyl (e.g., n-propyl, isopropyl), butyl (e.g., n-butyl, isobutyl, tert-butyl, sec-butyl), pentyl (e.g., n-pentyl, isopentyl, tert-pentyl, neopentyl, sec-pentyl, 3-pentyl), hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, and triacontyl. In certain embodiments, $R^c$ and $R^d$ are each independently, at each occurrence, selected from hydrogen and substituted or unsubstituted phenyl, dihydroindenyl, indenyl, naphthyl, dihydronaphthalenyl, or 5,6,7,8-tetrahydronaphthalenyl. In certain embodiments, $R^c$ and $R^d$ are each independently, at each occurrence, selected from hydrogen and substituted or unsubstituted cyclopropyl, cyclobutyl, cyclopentyl, cyclohexyl, cycloheptyl, cyclooctyl, cyclononyl, cyclodecyl, cycloundecyl, cyclododecyl, cyclotridecyl, cyclotetradecyl, cyclopentadecyl, cyclohexadecyl, cycloheptadecyl, or cyclooctodecyl. In certain embodiments, $R^c$ and $R^d$ are each independently, at each occurrence, selected from hydrogen and substituted or unsubstituted furanyl, imidazolyl, isoxazolyl, isothiazolyl, oxadiazolyl, oxazolyl, pyridinyl, pyridazinyl, pyrimidinyl, pyrazinyl, pyrazolyl, pyrrolyl, tetrazolyl, thiadiazolyl, thiazolyl, thienyl, triazolyl, triazinyl, benzofuranyl, benzothienyl, 1,3-benzoxazolyl, benzimidazolyl, indazolyl, indolyl, isoindolyl, isoquinolinyl, naphthyridinyl, pyridoimidazolyl, or quinolinyl. In certain embodiments, $R^c$ and $R^d$ are each independently, at each occurrence, selected from hydrogen and substituted or unsubstituted azetidinyl, azepanyl, aziridinyl, diazepanyl, 1,3-dioxanyl, 1,3-dioxolanyl, 1,3-dithiolanyl, 1,3-dithianyl, imidazolinyl, imidazolidinyl, isothiazolinyl, isothiazolidinyl, isoxazolinyl, isoxazolidinyl, morpholinyl, oxadiazolinyl, oxadiazolidinyl, oxazolinyl, oxazolidinyl, piperazinyl, piperidinyl, pyranyl, pyrazolinyl, pyrazolidinyl, pyrrolinyl, pyrrolidinyl, tetrahydrofuranyl, tetrahydrothienyl, thiadiazolinyl, thiadiazolidinyl, thiazolinyl, thiazolidinyl, 1,3-thiazolidinyl, thiomorpholinyl, 1,1-dioxidothiomorpholinyl, thiopyranyl, trithianyl, 1,3-benzodithiolyl, benzopyranyl, benzothiopyranyl, 2,3-dihydrobenzofuranyl, 2,3-dihydrobenzothienyl, 2,3-dihydro-1H-indolyl, 2,3-dihydroisoindol-2-yl, 2,3-dihydroisoindol-3-yl, 1,3-dixo-1H-isoindolyl, 5,6-dihydroimidazo-[1,2-a]pyrazin-7(8H)-yl, 1,2,3,4-tetrahydroisoquinolin-2-yl, or 1,2,3,4-tetrahydroquinolinyl.

In certain embodiments, m, at each occurrence, is 0. In certain embodiments, m, at each occurrence, is 1. In certain embodiments, m, at each occurrence, is 2. In certain embodiments, m, at each occurrence, is 3.

In certain embodiments, n ranges from 1 to 100, 1 to 50, 1 to 30, 1 to 20, 1 to 15, or 1 to 10. In certain embodiments, n is 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50.

In certain embodiments, the phenolic-aldehyde condensates have repeating units of formula (I-a),

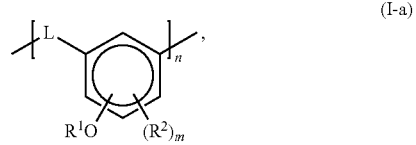

(I-a)

wherein $R^1$, $R^2$, L, m, and n are as defined above. In one preferred embodiment, $R^1$ is hydrogen at each occurrence, and $R^2$, at each occurrence, is independently selected from —OH and $C_1$-$C_8$ substituted or unsubstituted alkyl.

In certain embodiments, the phenolic-aldehyde condensates have repeating units of formula (I-b),

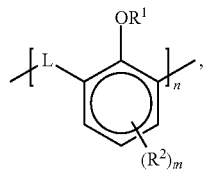

(I-b)

wherein $R^1$, $R^2$, L, m, and n are as defined above. In one preferred embodiment, $R^1$ is hydrogen at each occurrence, and $R^2$, at each occurrence, is independently selected from —OH and $C_1$-$C_8$ substituted or unsubstituted alkyl.

In certain embodiments, the phenolic-aldehyde condensates have repeating units of formula (I-c),

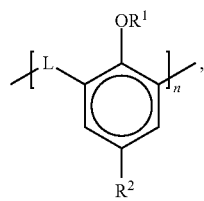

(I-c)

wherein $R^1$, $R^2$, L, and n are as defined above. In one preferred embodiment, $R^1$ is hydrogen at each occurrence, and $R^2$, at each occurrence, is independently selected from —OH and $C_1$-$C_8$ substituted or unsubstituted alkyl.

In certain embodiments, the phenolic-aldehyde condensates have repeating units of formula (I-d),

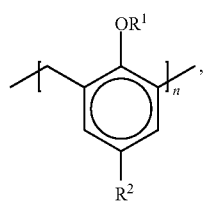

(I-d)

wherein $R^1$, $R^2$, and n are as defined above. In one preferred embodiment, $R^1$ is hydrogen at each occurrence, and $R^2$, at each occurrence, is independently selected from —OH and $C_1$-$C_8$ substituted or unsubstituted alkyl.

In certain embodiments, the phenolic-aldehyde condensates have repeating units of formula (I-e),

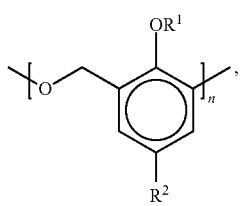

(I-e)

wherein $R^1$, $R^2$, and n are as defined above. In one preferred embodiment, $R^1$ is hydrogen at each occurrence, and $R^2$, at each occurrence, is independently selected from —OH and $C_1$-$C_8$ substituted or unsubstituted alkyl.

In certain embodiments, the phenolic-aldehyde condensates have repeating units of formula (I-f),

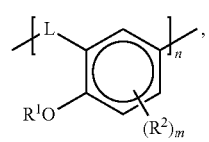

(I-f)

wherein $R^1$, $R^2$, L, m, and n are as defined above. In one preferred embodiment, $R^1$ is hydrogen at each occurrence, and $R^2$, at each occurrence, is independently selected from —OH and $C_1$-$C_8$ substituted or unsubstituted alkyl.

In certain embodiments, the phenolic-aldehyde condensates have repeating units of formula (I-g),

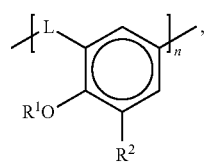

(I-g)

wherein $R^1$, $R^2$, L, and n are as defined above. In one preferred embodiment, $R^1$ is hydrogen at each occurrence, and $R^2$, at each occurrence, is independently selected from —OH and $C_1$-$C_8$ substituted or unsubstituted alkyl.

In certain embodiments, the phenolic-aldehyde condensates have repeating units of formula (I-h),

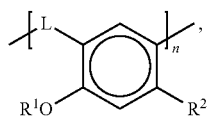

(I-h)

wherein $R^1$, $R^2$, L, and n are as defined above. In one preferred embodiment, $R^1$ is hydrogen at each occurrence, and $R^2$, at each occurrence, is independently selected from —OH and $C_1$-$C_8$ substituted or unsubstituted alkyl.

In certain embodiments, the phenolic-aldehyde condensates have repeating units of formula (I-i) or formula (I-j),

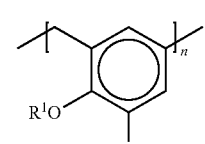

(I-i)

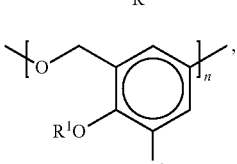

(I-j)

wherein $R^1$, $R^2$, and n are as defined above. In one preferred embodiment, $R^1$ is hydrogen at each occurrence, and $R^2$, at each occurrence, is independently selected from —OH and $C_1$-$C_8$ substituted or unsubstituted alkyl.

In certain embodiments, the phenolic-aldehyde condensates have repeating units of formula (I-k) or formula (I-l),

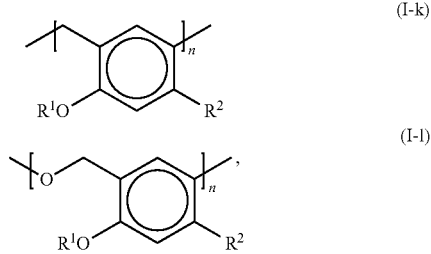

(I-k)

(I-l)

wherein $R^1$, $R^2$, and n are as defined above. In one preferred embodiment, $R^1$ is hydrogen at each occurrence, and $R^2$, at each occurrence, is independently selected from —OH and $C_1$-$C_8$ substituted or unsubstituted alkyl.

In another aspect, disclosed herein are phenolic-aldehyde condensates of formula (II),

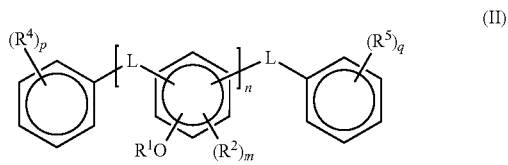

(II)

wherein, $R^1$, at each occurrence, is independently selected from the group consisting of hydrogen, alkyl, alkenyl, alkynyl, aryl, heteroaryl, heterocyclyl, and cycloalkyl;

$R^2$, at each occurrence, is independently selected from the group consisting of alkyl, alkenyl, alkynyl, aryl, heteroaryl, heterocyclyl, cycloalkyl, halogen, cyano, nitro, and —$OR^3$;

$R^3$, at each occurrence, is independently selected from the group consisting of hydrogen, alkyl, alkenyl, alkynyl, aryl, heteroaryl, heterocyclyl, and cycloalkyl;

$R^4$, at each occurrence, is independently selected from the group consisting of alkyl, alkenyl, alkynyl, aryl, heteroaryl, heterocyclyl, cycloalkyl, halogen, cyano, nitro, and —$OR^6$;

$R^5$, at each occurrence, is independently selected from the group consisting of alkyl, alkenyl, alkynyl, aryl, heteroaryl, heterocyclyl, cycloalkyl, halogen, cyano, nitro, and —$OR^7$;

$R^6$ and $R^7$, at each occurrence, are each independently selected from the group consisting of hydrogen, alkyl, alkenyl, alkynyl, aryl, heteroaryl, heterocyclyl, and cycloalkyl;

L is —$C(R^a)(R^b)$— or —O—$C(R^c)(R^d)$—;

$R^a$, $R^b$, $R^c$, and $R^d$ are, at each occurrence, are each independently selected from the group consisting of hydrogen, alkyl, alkenyl, alkynyl, aryl, heteroaryl, heterocyclyl, and cycloalkyl;

m, at each occurrence, is an integer independently selected from the group consisting of 0, 1, 2, and 3;

n is ≥1;

p is 1, 2, 3, 4, or 5; and q is 1, 2, 3, 4, or 5;

wherein said alkyl, alkenyl, alkynyl, aryl, heteroaryl, heterocyclyl, and cycloalkyl are each independently, at each occurrence, substituted or unsubstituted with one or more suitable substituents.

In certain embodiments, $R^1$ is hydrogen at each occurrence.

In certain embodiments, $R^1$, at each occurrence, is selected from hydrogen and substituted or unsubstituted alkyl. In certain embodiments, $R^1$, at each occurrence, is selected from hydrogen and substituted or unsubstituted linear $C_1$-$C_{30}$ alkyl, $C_1$-$C_{18}$ alkyl, or $C_1$-$C_8$ alkyl. In certain embodiments, $R^1$, at each occurrence, is selected from hydrogen and substituted or unsubstituted branched $C_1$-$C_{30}$ alkyl, $C_1$-$C_{18}$ alkyl, or $C_1$-$C_8$ alkyl. In certain embodiments, $R^1$, at each occurrence, is selected from hydrogen, methyl, ethyl, propyl (e.g., n-propyl, isopropyl), butyl (e.g., n-butyl, isobutyl, tert-butyl, sec-butyl), pentyl (e.g., n-pentyl, isopentyl, tert-pentyl, neopentyl, sec-pentyl, 3-pentyl), hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, and triacontyl.

In certain embodiments, $R^2$, at each occurrence, is selected from —$OR^3$ and substituted or unsubstituted alkyl. In certain embodiments, $R^2$, at each occurrence, is selected from —$OR^3$ and substituted or unsubstituted linear $C_1$-$C_{30}$ alkyl, $C_1$-$C_{18}$ alkyl, or $C_1$-$C_8$ alkyl. In certain embodiments, $R^2$, at each occurrence, is selected from —$OR^3$ and substituted or unsubstituted branched $C_1$-$C_{30}$ alkyl, $C_1$-$C_{18}$ alkyl, or $C_1$-$C_8$ alkyl. In certain embodiments, $R^2$, at each occurrence, is selected from —$OR^3$, methyl, ethyl, propyl (e.g., n-propyl, isopropyl), butyl (e.g., n-butyl, isobutyl, tert-butyl, sec-butyl), pentyl (e.g., n-pentyl, isopentyl, tert-pentyl, neopentyl, sec-pentyl, 3-pentyl), hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, and triacontyl.

In certain embodiments, $R^3$ is hydrogen at each occurrence.

In certain embodiments, $R^4$, at each occurrence, is selected from —$OR^6$ and substituted or unsubstituted alkyl. In certain embodiments, $R^4$, at each occurrence, is selected from —$OR^6$ and substituted or unsubstituted linear $C_1$-$C_{30}$ alkyl, $C_1$-$C_{18}$ alkyl, or $C_1$-$C_8$ alkyl. In certain embodiments, $R^4$, at each occurrence, is selected from —$OR^6$ and substituted or unsubstituted branched $C_1$-$C_{30}$ alkyl, $C_1$-$C_{18}$ alkyl, or $C_1$-$C_8$ alkyl. In certain embodiments, $R^4$, at each occurrence, is selected from —$OR^6$, methyl, ethyl, propyl (e.g., n-propyl, isopropyl), butyl (e.g., n-butyl, isobutyl, tert-butyl, sec-butyl), pentyl (e.g., n-pentyl, isopentyl, tert-pentyl, neopentyl, sec-pentyl, 3-pentyl), hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, and triacontyl.

In certain embodiments, $R^6$ is hydrogen at each occurrence.

In certain embodiments, $R^5$, at each occurrence, is selected from —OR' and substituted or unsubstituted alkyl. In certain embodiments, $R^5$, at each occurrence, is selected from —OR' and substituted or unsubstituted linear $C_1$-$C_{30}$ alkyl, $C_1$-$C_{18}$ alkyl, or $C_1$-$C_8$ alkyl. In certain embodiments, $R^5$, at each occurrence, is selected from —OR' and substituted or unsubstituted branched $C_1$-$C_{30}$ alkyl, $C_1$-$C_{18}$ alkyl, or $C_1$-$C_8$ alkyl. In certain embodiments, $R^5$, at each occurrence, is selected from —OR', methyl, ethyl, propyl (e.g., n-propyl, isopropyl), butyl (e.g., n-butyl, isobutyl, tert-butyl, sec-butyl), pentyl (e.g., n-pentyl, isopentyl, tert-pentyl, neopentyl, sec-pentyl, 3-pentyl), hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, and triacontyl.

In certain embodiments, $R^7$ is hydrogen at each occurrence.

In certain embodiments, L is —C($R^a$)($R^b$)—. In certain embodiments, $R^a$ and $R^b$ are each independently, at each occurrence, hydrogen such that L is —CH$_2$—. In certain embodiments, $R^a$ and $R^b$ are each independently, at each occurrence, selected from hydrogen and substituted or unsubstituted linear $C_1$-$C_{18}$ alkyl. In certain embodiments, $R^a$ and $R^b$ are each independently, at each occurrence, selected from hydrogen and substituted or unsubstituted branched $C_1$-$C_{18}$ alkyl. In certain embodiments, $R^a$ and $R^b$ are each independently, at each occurrence, selected from hydrogen, methyl, ethyl, propyl (e.g., n-propyl, isopropyl), butyl (e.g., n-butyl, isobutyl, tert-butyl, sec-butyl), pentyl (e.g., n-pentyl, isopentyl, tert-pentyl, neopentyl, sec-pentyl, 3-pentyl), hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, and triacontyl. In certain embodiments, $R^a$ and $R^b$ are each independently, at each occurrence, selected from hydrogen and substituted or unsubstituted phenyl, dihydroindenyl, indenyl, naphthyl, dihydronaphthalenyl, or 5,6,7,8-tetrahydronaphthalenyl. In certain embodiments, $R^a$ and $R^b$ are each independently, at each occurrence, selected from hydrogen and substituted or unsubstituted cyclopropyl, cyclobutyl, cyclopentyl, cyclohexyl, cycloheptyl, cyclooctyl, cyclononyl, cyclodecyl, cycloundecyl, cyclododecyl, cyclotridecyl, cyclotetradecyl, cyclopentadecyl, cyclohexadecyl, cycloheptadecyl, or cyclooctodecyl. In certain embodiments, $R^a$ and $R^b$ are each independently, at each occurrence, selected from hydrogen and substituted or unsubstituted furanyl, imidazolyl, isoxazolyl, isothiazolyl, oxadiazolyl, oxazolyl, pyridinyl, pyridazinyl, pyrimidinyl, pyrazinyl, pyrazolyl, pyrrolyl, tetrazolyl, thiadiazolyl, thiazolyl, thienyl, triazolyl, triazinyl, benzofuranyl, benzothienyl, 1,3-benzoxazolyl, benzimidazolyl, indazolyl, indolyl, isoindolyl, isoquinolinyl, naphthyridinyl, pyridoimidazolyl, or quinolinyl. In certain embodiments, $R^a$ and $R^b$ are each independently, at each occurrence, selected from hydrogen and substituted or unsubstituted azetidinyl, azepanyl, aziridinyl, diazepanyl, 1,3-dioxanyl, 1,3-dioxolanyl, 1,3-dithiolanyl, 1,3-dithianyl, imidazolinyl, imidazolidinyl, isothiazolinyl, isothiazolidinyl, isoxazolinyl, isoxazolidinyl, morpholinyl, oxadiazolinyl, oxadiazolidinyl, oxazolinyl, oxazolidinyl, piperazinyl, piperidinyl, pyranyl, pyrazolinyl, pyrazolidinyl, pyrrolinyl, pyrrolidinyl, tetrahydrofuranyl, tetrahydrothienyl, thiadiazolinyl, thiadiazolidinyl, thiazolinyl, thiazolidinyl, 1,3-thiazolidinyl, thiomorpholinyl, 1,1-dioxidothiomorpholinyl, thiopyranyl, trithianyl, 1,3-benzodithiolyl, benzopyranyl, benzothiopyranyl, 2,3-dihydrobenzofuranyl, 2,3-dihydrobenzothienyl, 2,3-dihydro-1H-indolyl, 2,3-dihydroisoindol-2-yl, 2,3-dihydroisoindol-3-yl, 1,3-dixo-1H-isoindolyl, 5,6-dihydroimidazo-[1,2-a]pyrazin-7(8H)-yl, 1,2,3,4-tetrahydroisoquinolin-2-yl, or 1,2,3,4-tetrahydroquinolinyl.

In certain embodiments, L is —O—C($R^c$)($R^d$)—. In certain embodiments, $R^c$ and $R^d$ are each hydrogen such that L is —O—CH$_2$—. In certain embodiments, $R^c$ and $R^d$ are each independently, at each occurrence, selected from hydrogen and substituted or unsubstituted linear $C_1$-$C_{18}$ alkyl. In certain embodiments, $R^c$ and $R^d$ are each independently, at each occurrence, selected from hydrogen and substituted or unsubstituted branched $C_1$-$C_{18}$ alkyl. In certain embodiments, $R^c$ and $R^d$ are each independently, at each occurrence, selected from hydrogen, methyl, ethyl, propyl (e.g., n-propyl, isopropyl), butyl (e.g., n-butyl, isobutyl, tert-butyl, sec-butyl), pentyl (e.g., n-pentyl, isopentyl, tert-pentyl, neopentyl, sec-pentyl, 3-pentyl), hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, and triacontyl. In certain embodiments, $R^c$ and $R^d$ are each independently, at each occurrence, selected from hydrogen and substituted or unsubstituted phenyl, dihydroindenyl, indenyl, naphthyl, dihydronaphthalenyl, or 5,6,7,8-tetrahydronaphthalenyl. In certain embodiments, $R^c$ and $R^d$ are each independently, at each occurrence, selected from hydrogen and substituted or unsubstituted cyclopropyl, cyclobutyl, cyclopentyl, cyclohexyl, cycloheptyl, cyclooctyl, cyclononyl, cyclodecyl, cycloundecyl, cyclododecyl, cyclotridecyl, cyclotetradecyl, cyclopentadecyl, cyclohexadecyl, cycloheptadecyl, or cyclooctodecyl. In certain embodiments, $R^c$ and $R^d$ are each independently, at each occurrence, selected from hydrogen and substituted or unsubstituted furanyl, imidazolyl, isoxazolyl, isothiazolyl, oxadiazolyl, oxazolyl, pyridinyl, pyridazinyl, pyrimidinyl, pyrazinyl, pyrazolyl, pyrrolyl, tetrazolyl, thiadiazolyl, thiazolyl, thienyl, triazolyl, triazinyl, benzofuranyl, benzothienyl, 1,3-benzoxazolyl, benzimidazolyl, indazolyl, indolyl, isoindolyl, isoquinolinyl, naphthyridinyl, pyridoimidazolyl, or quinolinyl. In certain embodiments, $R^c$ and $R^d$ are each independently, at each occurrence, selected from hydrogen and substituted or unsubstituted azetidinyl, azepanyl, aziridinyl, diazepanyl, 1,3-dioxanyl, 1,3-dioxolanyl, 1,3-dithiolanyl, 1,3-dithianyl, imidazolinyl, imidazolidinyl, isothiazolinyl, isothiazolidinyl, isoxazolinyl, isoxazolidinyl, morpholinyl, oxadiazolinyl, oxadiazolidinyl, oxazolinyl, oxazolidinyl, piperazinyl, piperidinyl, pyranyl, pyrazolinyl, pyrazolidinyl, pyrrolinyl, pyrrolidinyl, tetrahydrofuranyl, tetrahydrothienyl, thiadiazolinyl, thiadiazolidinyl, thiazolinyl, thiazolidinyl, 1,3-thiazolidinyl, thiomorpholinyl, 1,1-dioxidothiomorpholinyl, thiopyranyl, trithianyl, 1,3-benzodithiolyl, benzopyranyl, benzothiopyranyl, 2,3-dihydrobenzofuranyl, 2,3-dihydrobenzothienyl, 2,3-dihydro-1H-indolyl, 2,3-dihydroisoindol-2-yl, 2,3-dihydroisoindol-3-yl, 1,3-dixo-1H-isoindolyl, 5,6-dihydroimidazo-[1,2-a]pyrazin-7(8H)-yl, 1,2,3,4-tetrahydroisoquinolin-2-yl, or 1,2,3,4-tetrahydroquinolinyl.

In certain embodiments, m, at each occurrence, is 0. In certain embodiments, m, at each occurrence, is 1. In certain embodiments, m, at each occurrence, is 2. In certain embodiments, m, at each occurrence, is 3.

In certain embodiments, p is 1. In certain embodiments, p is 2. In certain embodiments, p is 3. In certain embodiments, p is 4. In certain embodiments, p is 5.

In certain embodiments, q is 1. In certain embodiments, q is 2. In certain embodiments, q is 3. In certain embodiments, q is 4. In certain embodiments, q is 5.

In certain embodiments, n ranges from 1 to 100, 1 to 50, 1 to 30, 1 to 20, 1 to 15, or 1 to 10. In certain embodiments, n is 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50.

In certain embodiments, the phenolic-aldehyde condensates have formula (II-a),

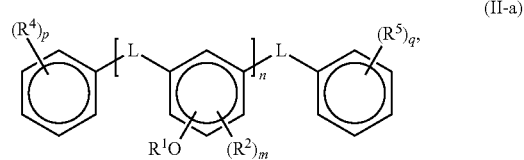

(II-a)

wherein $R^1$, $R^2$, $R^4$, $R^5$, L, m, n, p, and q are as defined above. In one preferred embodiment, $R^1$ is hydrogen at each occurrence; $R^2$, at each occurrence, is independently selected from —OH and $C_1$-$C_8$ substituted or unsubstituted alkyl; p is 1 or 2 wherein at least one $R^4$ is —OH and the other optional $R^4$ is selected from —OH and $C_1$-$C_8$ substituted or unsubstituted alkyl; and q is 1 or 2 wherein at least one $R^5$ is —OH and the other optional $R^5$ is selected from —OH and $C_1$-$C_8$ substituted or unsubstituted alkyl.

In certain embodiments, the phenolic-aldehyde condensates have formula (II-b),

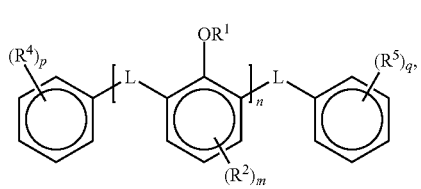

(II-b)

wherein $R^1$, $R^2$, $R^4$, $R^5$, L, m, n, p, and q are as defined above. In one preferred embodiment, $R^1$ is hydrogen at each occurrence; $R^2$, at each occurrence, is independently selected from —OH and $C_1$-$C_8$ substituted or unsubstituted alkyl; p is 1 or 2 wherein at least one $R^4$ is —OH and the other optional $R^4$ is selected from —OH and $C_1$-$C_8$ substituted or unsubstituted alkyl; and q is 1 or 2 wherein at least one $R^5$ is —OH and the other optional $R^5$ is selected from —OH and $C_1$-$C_8$ substituted or unsubstituted alkyl.

In certain embodiments, the phenolic-aldehyde condensates have formula (II-c),

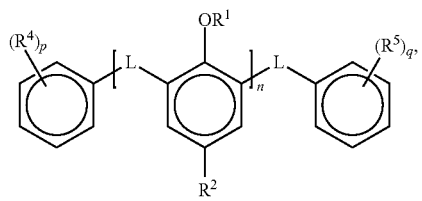

(II-c)

wherein $R^1$, $R^2$, $R^4$, $R^5$, L, n, p, and q are as defined above. In one preferred embodiment, $R^1$ is hydrogen at each occurrence; $R^2$, at each occurrence, is independently selected from —OH and $C_1$-$C_8$ substituted or unsubstituted alkyl; p is 1 or 2 wherein at least one $R^4$ is —OH and the other optional $R^4$ is selected from —OH and $C_1$-$C_8$ substituted or unsubstituted alkyl; and q is 1 or 2 wherein at least one $R^5$ is —OH and the other optional $R^5$ is selected from —OH and $C_1$-$C_8$ substituted or unsubstituted alkyl.

In certain embodiments, the phenolic-aldehyde condensates have formula (II-d),

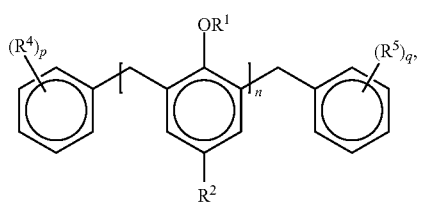

(II-d)

wherein $R^1$, $R^2$, $R^4$, $R^5$, n, p, and q are as defined above. In one preferred embodiment, $R^1$ is hydrogen at each occurrence; $R^2$, at each occurrence, is independently selected from —OH and $C_1$-$C_8$ substituted or unsubstituted alkyl; p is 1 or 2 wherein at least one $R^4$ is —OH and the other optional $R^4$ is selected from —OH and $C_1$-$C_8$ substituted or unsubstituted alkyl; and q is 1 or 2 wherein at least one $R^5$ is —OH and the other optional $R^5$ is selected from —OH and $C_1$-$C_8$ substituted or unsubstituted alkyl.

In certain embodiments, the phenolic-aldehyde condensates have formula (II-e),

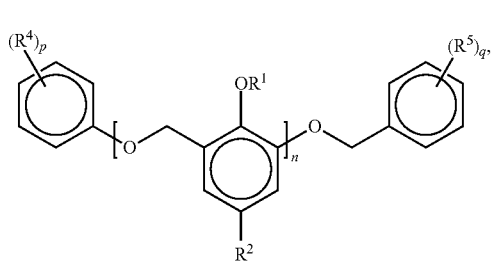

(II-e)

wherein $R^1$, $R^2$, $R^4$, $R^5$, n, p, and q are as defined above. In one preferred embodiment, $R^1$ is hydrogen at each occurrence; $R^2$, at each occurrence, is independently selected from —OH and $C_1$-$C_8$ substituted or unsubstituted alkyl; p is 1 or 2 wherein at least one $R^4$ is —OH and the other optional $R^4$ is selected from —OH and $C_1$-$C_8$ substituted or unsubstituted alkyl; and q is 1 or 2 wherein at least one $R^5$ is —OH and the other optional $R^5$ is selected from —OH and $C_1$-$C_8$ substituted or unsubstituted alkyl.

In certain embodiments, the phenolic-aldehyde condensates have formula (II-f),

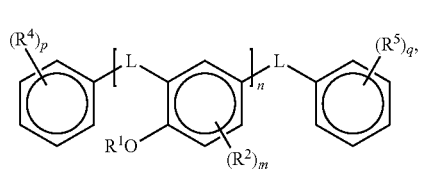

(II-f)

wherein $R^1$, $R^2$, $R^4$, $R^5$, L, m, n, p, and q are as defined above. In one preferred embodiment, $R^1$ is hydrogen at each occurrence; $R^2$, at each occurrence, is independently selected from —OH and $C_1$-$C_8$ substituted or unsubstituted alkyl; p is 1 or 2 wherein at least one $R^4$ is —OH and the other optional $R^4$ is selected from —OH and $C_1$-$C_8$ substituted or unsubstituted alkyl; and q is 1 or 2 wherein at least one $R^5$ is —OH and the other optional $R^5$ is selected from —OH and $C_1$-$C_8$ substituted or unsubstituted alkyl.

In certain embodiments, the phenolic-aldehyde condensates have formula (II-g),

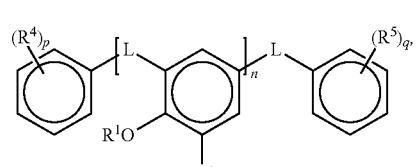

(II-g)

wherein $R^1$, $R^2$, $R^4$, $R^5$, L, n, p, and q are as defined above. In one preferred embodiment, $R^1$ is hydrogen at each occurrence; $R^2$, at each occurrence, is independently selected from —OH and $C_1$-$C_8$ substituted or unsubstituted alkyl; p is 1 or 2 wherein at least one $R^4$ is —OH and the other optional $R^4$ is selected from —OH and $C_1$-$C_8$ substituted or unsubstituted alkyl; and q is 1 or 2 wherein at least one $R^5$ is —OH and the other optional $R^5$ is selected from —OH and $C_1$-$C_8$ substituted or unsubstituted alkyl.

In certain embodiments, the phenolic-aldehyde condensates have formula (II-h),

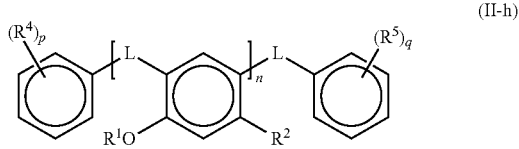

(II-h)

wherein $R^1$, $R^2$, $R^4$, $R^5$, L, n, p, and q are as defined above. In one preferred embodiment, $R^1$ is hydrogen at each occurrence; $R^2$, at each occurrence, is independently selected from —OH and $C_1$-$C_8$ substituted or unsubstituted alkyl; p is 1 or 2 wherein at least one $R^4$ is —OH and the other optional $R^4$ is selected from —OH and $C_1$-$C_8$ substituted or unsubstituted alkyl; and q is 1 or 2 wherein at least one $R^5$ is —OH and the other optional $R^5$ is selected from —OH and $C_1$-$C_8$ substituted or unsubstituted alkyl.

In certain embodiments, the phenolic-aldehyde condensates have formula (II-i) or formula (II-j),

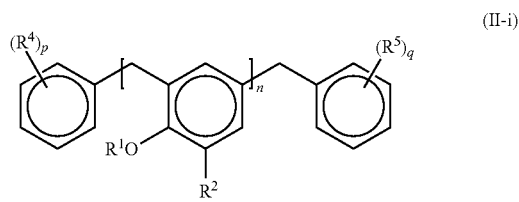

(II-i)

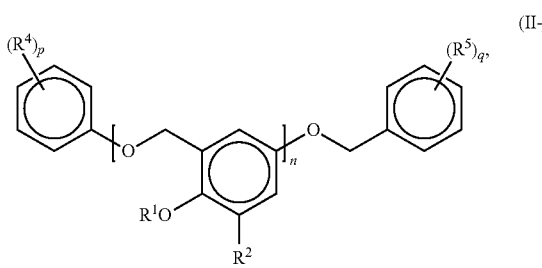

(II-j)

wherein $R^1$, $R^2$, $R^4$, $R^5$, n, p, and q are as defined above. In one preferred embodiment, $R^1$ is hydrogen at each occurrence; $R^2$, at each occurrence, is independently selected from —OH and $C_1$-$C_8$ substituted or unsubstituted alkyl; p is 1 or 2 wherein at least one $R^4$ is —OH and the other optional $R^4$ is selected from —OH and $C_1$-$C_8$ substituted or unsubstituted alkyl; and q is 1 or 2 wherein at least one $R^5$ is —OH and the other optional $R^5$ is selected from —OH and $C_1$-$C_8$ substituted or unsubstituted alkyl.

In certain embodiments, the phenolic-aldehyde condensates have formula (II-k) or formula (II-1),

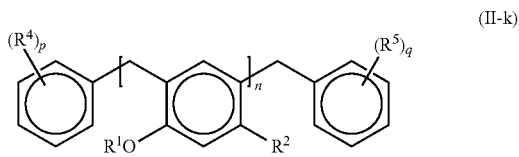

(II-k)

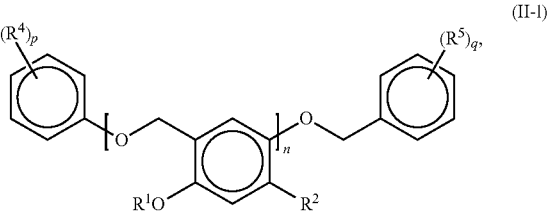

(II-1)

wherein $R^1$, $R^2$, $R^4$, $R^5$, n, p, and q are as defined above. In one preferred embodiment, $R^1$ is hydrogen at each occurrence; $R^2$, at each occurrence, is independently selected from —OH and $C_1$-$C_8$ substituted or unsubstituted alkyl; p is 1 or 2 wherein at least one $R^4$ is —OH and the other optional $R^4$ is selected from —OH and $C_1$-$C_8$ substituted or unsubstituted alkyl; and q is 1 or 2 wherein at least one $R^5$ is —OH and the other optional $R^5$ is selected from —OH and $C_1$-$C_8$ substituted or unsubstituted alkyl.

The phenolic-aldehyde condensates may contain asymmetric centers and can thus occur as racemates and racemic mixtures, single enantiomers, diastereomeric mixtures and individual diastereomers. Additional asymmetric centers may be present depending upon the nature of the various substituents on the molecule. Each such asymmetric center will independently produce two optical isomers and it is intended that all of the possible optical isomers and diastereomers in mixtures and as pure or partially purified compounds are included within the scope of this invention. The present invention is meant to comprehend all such isomeric forms of these compounds.

In another aspect, disclosed herein are phenolic-aldehyde condensates produced by an acid catalyzed or base catalyzed reaction between an aldehyde (e.g., formaldehyde, or paraformaldehyde) and a mixture of one or more phenols. In certain embodiments, the phenolic-aldehyde condensates are products produced by an acid catalyzed or base catalyzed reaction between an aldehyde (e.g., formaldehyde, or paraformaldehyde) and phenol, a mixture of one or more monoalkylphenols, a mixture of one or more dialkylphenols, a mixture of one or more substituted or unsubstituted diphenols, or a combination thereof. In certain embodiments, the phenol is selected from the group consisting of phenol, resorcinol, butylphenol, cresol, and octylphenol.

Specific embodiments of the invention include, but are not limited to: a butylphenol formaldehyde resin formed under acidic conditions; a butylphenol formaldehyde resin formed under basic conditions; a resorcinol formaldehyde resin formed under acidic conditions; a resorcinol formaldehyde resin formed under basic conditions; a phenol formaldehyde resin formed under acidic conditions; a phenol formaldehyde resin formed under basic conditions; a cresol formaldehyde resin formed under acidic conditions; a cresol formaldehyde resin formed under basic conditions; an octylphenol formaldehyde resin formed under acidic conditions; and an octylphenol formaldehyde resin formed under basic conditions.

3. COMPOSITIONS

The compositions disclosed herein include at least one compound as described above.

In certain embodiments, a composition of the invention contains a pure composition of a phenolic-aldehyde condensate having repeating units of formula (I). In other embodiments, a composition of the invention contains a mixture of two or more structurally distinct phenolic-aldehyde condensates having repeating units of formula (I). For example, in certain embodiments, a composition of the invention may comprise a mixture of the phenolic-aldehyde condensates wherein n is variable, and/or wherein $R^1$ is variable, and/or wherein $R^2$ is variable, and/or wherein L is variable, and/or wherein m is variable, and/or wherein the pattern of linkage to the repeating aryl varies (e.g., para, ortho, or meta with respect to the linking L groups).

In certain embodiments, a composition of the invention may comprise a mixture of phenolic-aldehyde condensates having repeating units of formula (I), wherein n is variable. For example, in certain embodiments, a composition of the invention may comprise a mixture of phenolic-aldehyde condensates wherein n is variable, and the remaining variables $R^1$, $R^2$, L, and m are the same across the repeating units of formula (I) in the composition. Such a composition may be characterized by a weight average molecular weight and a polydispersity.

In certain embodiments, a composition of the invention may comprise a mixture of phenolic-aldehyde condensates having repeating units of formula (I), wherein n is variable; $R^1$ is hydrogen at each occurrence; $R^2$, at each occurrence, is independently selected from is —OH and $C_1$-$C_8$ substituted or unsubstituted alkyl; L, at each occurrence, is —$CH_2$—; and m, at each occurrence, is 1. In certain embodiments, $R^2$ is unsubstituted $C_1$-$C_8$ alkyl at each occurrence.

In certain embodiments, a composition of the invention may comprise a mixture of phenolic-aldehyde condensates having repeating units of formula (I), wherein n is variable; $R^1$ is hydrogen at each occurrence; $R^2$, at each occurrence, is independently selected from is —OH and $C_1$-$C_8$ substituted or unsubstituted alkyl; L, at each occurrence, is —O—$CH_2$—; and m, at each occurrence, is 1. In certain embodiments, $R^2$ is unsubstituted $C_1$-$C_8$ alkyl at each occurrence.

In certain embodiments, a composition of the invention may comprise a mixture of phenolic-aldehyde condensates having repeating units of formula (I), wherein the pattern of linkage of the L groups to the repeating aryl varies. In certain embodiments, a composition of the invention may comprise a mixture of phenolic-aldehyde condensates having repeating units of formula (I), wherein the pattern of linkage of the L groups to the repeating aryl varies, and wherein the n variable varies across the phenolic-aldehyde condensates in the composition.

In certain embodiments, a composition of the invention contains a mixture of phenolic-aldehyde condensates having repeating units of formula (I), wherein $R^a$ and/or $R^b$ vary, particularly where different aldehydes have been used to prepare the compounds.

In certain embodiments, a composition of the invention contains a mixture of phenolic-aldehyde condensates having repeating units of formula (I), wherein $R^1$ and/or $R^2$ and/or m vary, particularly where different phenols have been used to prepare the compounds.

In certain embodiments, a composition of the invention contains a pure composition of a phenolic-aldehyde condensate of formula (II). In other embodiments, a composition of the invention contains a mixture of two or more structurally distinct phenolic-aldehyde condensates of formula (II). For example, in certain embodiments, a composition of the invention may comprise a mixture of the phenolic-aldehyde condensates wherein n is variable, and/or wherein $R^1$ is variable, and/or wherein $R^2$ is variable, and/or wherein $R^4$ is variable, and/or wherein $R^5$ is variable, and/or wherein L is variable, and/or wherein m is variable, and/or wherein p is variable, and/or wherein q is variable, and/or wherein the pattern of linkage to the repeating aryl varies (e.g., para, ortho, or meta with respect to the linking L groups).

In certain embodiments, a composition of the invention may comprise a mixture of phenolic-aldehyde condensates of formula (II), wherein n is variable. For example, in certain embodiments, a composition of the invention may comprise a mixture of phenolic-aldehyde condensates wherein n is variable, and the remaining variables $R^1$, $R^2$, $R^4$, $R^5$, L, m, p, and q are the same across the compounds of formula (II) in the composition. Such a composition may be characterized by a weight average molecular weight and a polydispersity.

In certain embodiments, a composition of the invention may comprise a mixture of phenolic-aldehyde condensates of formula (II), wherein n is variable; $R^1$ is hydrogen at each occurrence; $R^2$, $R^4$, and $R^5$, at each occurrence, are each independently selected from —OH and $C_1$-$C_8$ substituted or unsubstituted alkyl; L, at each occurrence, is —$CH_2$—; and m, p, and q, at each occurrence, are each 1. In certain embodiments, $R^2$, $R^4$, and $R^5$ are unsubstituted $C_1$-$C_8$ alkyl at each occurrence.

In certain embodiments, a composition of the invention may comprise a mixture of phenolic-aldehyde condensates of formula (II), wherein n is variable; $R^1$ is hydrogen at each occurrence; $R^2$, $R^4$, and $R^5$, at each occurrence, are each independently selected from —OH and $C_1$-$C_8$ substituted or unsubstituted alkyl; L, at each occurrence, is —O—$CH_2$—; and m, p, and q, at each occurrence, are each 1. In certain embodiments, $R^2$ is unsubstituted $C_1$-$C_8$ alkyl at each occurrence.

In certain embodiments, a composition of the invention may comprise a mixture of phenolic-aldehyde condensates of formula (II), wherein the pattern of linkage of the L groups to the repeating aryl varies. In certain embodiments, a composition of the invention may comprise a mixture of phenolic-aldehyde condensates of formula (II), wherein the pattern of linkage of the L groups to the repeating aryl varies, and wherein the n variable varies across the phenolic-aldehyde condensates in the composition.

In certain embodiments, a composition of the invention contains a mixture of phenolic-aldehyde condensates of formula (II), wherein $R^a$ and/or $R^b$ vary, particularly where different aldehydes have been used to prepare the compounds.

In certain embodiments, a composition of the invention contains a mixture of phenolic-aldehyde condensates of formula (II), wherein $R^1$ and/or $R^2$ and/or $R^4$ and/or $R^5$ and/or m and/or p and/or q vary, particularly where different phenols have been used to prepare the compounds.

The compositions of the invention can optionally include one or more solvents. Suitable solvents include, but are not limited to, ethoxylated and propoxylated alkyl ethers or alcohols, fatty acid esters, low aromatic hydrocarbon oils, kerosene, heavy aromatic naphtha ("HAN"), propylene glycol monomethyl ether, n-butanol, isobutanol, and combinations thereof.

Specific embodiments of the invention include, but are not limited to: a formulation comprising a butylphenol formaldehyde resin formed under acidic conditions, and an ethoxylated and propoxylated alkyl ether; a formulation comprising a butylphenol formaldehyde resin formed under acidic conditions, and kerosene; a formulation comprising a butylphenol formaldehyde resin formed under basic conditions, and an ethoxylated and propoxylated alkyl ether; a formulation comprising a butylphenol formaldehyde resin formed under basic conditions, and kerosene; a formulation comprising a resorcinol formaldehyde resin, and a sodium hydroxide solution; a formulation comprising a phenol formaldehyde resin formed under acidic conditions, and an ethoxylated and propoxylated alkyl ether; a formulation comprising a cresol formaldehyde resin formed under basic conditions, propylene glycol monomethyl ether, n-butanol, and isobutanol; and a formulation comprising an octylphenol formaldehyde resin formed under acidic conditions, and kerosene.

4. SYNTHESIS

The compounds and compositions of the invention can be better understood in connection with the following synthetic schemes and methods which illustrate a means by which the compounds can be prepared.

Scheme 1

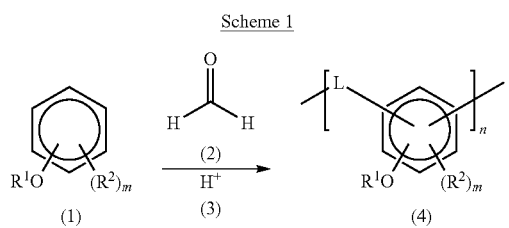

Phenolic-aldehyde condensates of the invention can be prepared as described in Scheme 1, wherein $R^1$, $R^2$, m, and n are as defined above, and where L is —$CH_2$—. Treatment of a phenol of formula (1), optionally in excess, with an aldehyde (2) (e.g., formaldehyde, paraformaldehyde) in the presence of an acid (3) will provide phenolic-aldehyde condensates of formula (4). Thus, Scheme 1 depicts phenolic-aldehyde condensates formed under acidic conditions, and in particular, where L is —$CH_2$—.

Scheme 2

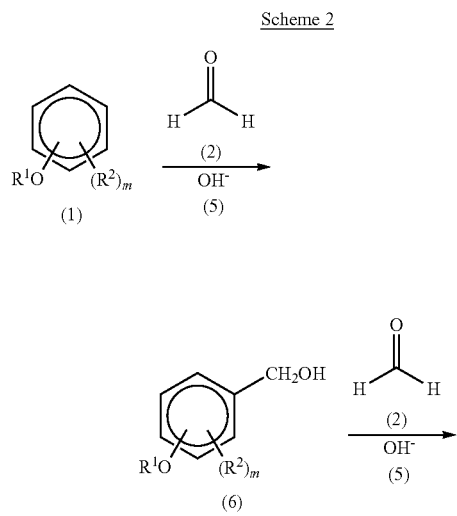

-continued

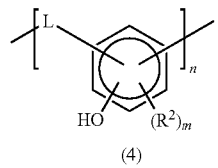

Alternatively, phenolic-aldehyde condensates of the invention can be prepared as described in Scheme 2, wherein $R^1$, $R^2$, m, and n are as defined above, and where L is —O—$CH_2$—. Treatment of a phenol of formula (1), optionally in excess, with an aldehyde (2) (e.g., formaldehyde, paraformaldehyde) in the presence of a base (5) will provide a compound of formula (6), which undergoes further reaction with aldehyde of formula (2) and base of formula (5) to provide phenolic-aldehyde condensates of formula (4). Thus, Scheme 2 depicts phenolic-aldehyde condensates formed under basic conditions, and in particular, where L is —O—$CH_2$—.

5. METHODS

The compounds and compositions of the invention (also referred to herein as "crystal growth modifiers") may be used to aid crystallization of aluminum hydroxide, and in particular, aluminum hydroxide from a precipitation liquor. The phenolic-aldehyde resins may be applied neat, or depending on the solubility, as solutions in hydrocarbon oils, ethoxylated or propoxylated alkyl ethers or alcohols, fatty acid esters, or combinations thereof.

The precipitation liquor may be located in a Bayer process. The crystal growth modifiers may be introduced into the precipitation liquor via various routes. The phenolic-aldehyde condensates may be added to the pregnant liquor or anywhere in the crystallization circuit, including the seed and in any of the tanks in the crystallization train.

In certain embodiments, the compounds and compositions can be introduced to the precipitation liquor at the following steps of a Bayer process: a) to a precipitation feed liquor, b) to a seed slurry, c) directly into a precipitation tank, or d) any combination thereof. In certain embodiments, the compounds and compositions can be added to a precipitation liquor via various modes of addition, such as in-line injection.

A method of the invention may include addition of a compound or composition of the invention to a Bayer process liquor. The method may include a reduced formation of product fines concurrent with an upward shift in particle size distribution of aluminum hydroxide.

A method of the invention may include a Bayer process for the formation of aluminum hydroxide crystals, said process comprising crystallization of dissolved aluminum hydroxide as gibbsite from a filtrate to produce gibbsite crystals, wherein the crystallization is aided by a crystal growth modifier of the invention, said crystal growth modifier added to the filtrate before, during, or both before and during, the crystallization, the gibbsite crystals produced in the process being courser than when crystallization occurs from an otherwise identical filtrate that contains no crystal growth modifier as disclosed herein.

The amount of crystal growth modifier required to produce a desirable effect depends upon the precipitation process parameters. Most often, this amount is determined by the surface area of available hydrated alumina solids in the precipitation liquor. The solids comprise the aluminum hydroxide introduced as seed or originated as new crystals or agglomerates during the decomposition of precipitation liquor. The suitable amount of crystal growth modifier may range from about 0.01 to about 30 mg per square meter of the available aluminum hydroxide seed area, and preferably, from about 0.1 to about 15 mg per square meter. Commonly, less than about 8 mg/m$^2$ of CGM can be used.

In case the available aluminum hydroxide area may not be reliably determined, the precipitation operators can dose the crystal growth modifier by volume. The crystal growth modifier amount may range from about 0.01 to about 400 mg/liter of precipitation liquor, preferably from about 0.05 to about 200 mg/liter of precipitation liquor. Commonly less than about 100 mg/liter of CGM can be used.

The addition of the crystal growth modifiers to the precipitation liquor reduces the percent of alumina trihydrate crystal fines formed in the Bayer process substantially without any decrease in the overall product yield and thereby increases the yield of alumina trihydrate crystals of optimal particle size for aluminum metal production.

In certain embodiments, the addition of the crystal growth modifier results in at least half of the recovered crystals by weight exceed 325 mesh (44-45 microns). In certain embodiments, the addition of the crystal growth modifier results in at least half of the recovered crystals by weight exceed at least 40 microns, at least 45 microns, at least 50 microns, at least 55 microns, at least 60 microns, at least 65 microns, at least 70 microns, at least 75 microns, at least 80 microns, at least 85 microns, at least 90 microns, or at least 95 microns. In certain embodiments, the addition of the crystal growth modifier results in at least half of the recovered crystals by weight exceed 40 microns, 41 microns, 42 microns, 43 microns, 44 microns, 45 microns, 46 microns, 47 microns, 48 microns, 49 microns, 50 microns, 51 microns, 52 microns, 53 microns, 54 microns, 55 microns, 56 microns, 57 microns, 58 microns, 59 microns, 60 microns, 61 microns, 62 microns, 63 microns, 64 microns, 65 microns, 66 microns, 67 microns, 68 microns, 69 microns, 70 microns, 71 microns, 72 microns, 73 microns, 74 microns, 75 microns, 76 microns, 77 microns, 78 microns, 79 microns, 80 microns, 81 microns, 82 microns, 83 microns, 84 microns, 85 microns, 86 microns, 87 microns, 88 microns, 89 microns, 90 microns, 91 microns, 92 microns, 93 microns, 94 microns, or 95 microns.

In certain embodiments, the crystal growth modifiers provide a % increase in mean of control quantile size of at least 5%, at least 10%, at least 15%, at least 20%, at least 25%, or at least 30%. In certain embodiments, the crystal growth modifiers provide a % increase in mean of control quantile size of 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, or 35% for any of d(0.1), d(0.5), or d(0.9).

In certain embodiments, an upward shift in oxalate ball size also occurs. In certain embodiments, oxalate balls precipitate to a size in the range of from about 200 to about 10,000 lam. In certain embodiments, oxalate balls precipitate to a size in the range of about 300 μm.

The addition of crystal growth modifier also provides a more effective Bayer process wherein the yield of coarser alumina trihydrate particles is increased, and the separation and collection of alumina trihydrate from the alkaline liquor is improved.

6. EXAMPLES

The foregoing may be better understood by reference to the following examples, which are presented for purposes of illustration and are not intended to limit the scope of the invention.

An exemplary test procedure for evaluating crystal growth modifiers can be conducted as follows. Tests are run using fresh pregnant liquor, obtained from the reconstitution of plant spent liquor. A desired weight of spent liquor is measured into a stainless steel beaker and the volume reduced by evaporation to about 30%. To this a set weight of aluminum hydroxide solid is added and the mixture stirred until it is dissolved. This solution is removed from the hot plate and placed on a weighing balance and de-ionized water added until a desired weight is attained. The pregnant liquor is filtered to remove any insoluble material.

Precipitation tests are performed in 250-mL Nalgene® bottles rotated end-over-end, at 10 rpm, in an Intronics temperature-controlled water bath. The pregnant liquor having a density of 1.30 kg/L (~72° C.) is placed into the bottles by weight (200 mL=260.0 g), for improved precision. The crystal growth modifier is dosed, with respect to the total surface area of the seed crystals (mg/m$^2$) (e.g., 2 mg or 4 mg), to the lid of the appropriate bottles using a micro-syringe and the bottles are then placed in the rotating bath for equilibration at 72° C. (20 minutes). After equilibration, the bottles are removed, quickly charged with the required quantity of seed (50 g/L, based on liquor volume) and immediately returned to the water bath. The temperature of the water bath is set to 72° C., for example. The bottles are rotated overnight for 15 hours.

On completion of the 15 hours, the bottles are removed and for each bottle a 20-mL sample of the slurry is filtered through a syringe filter and submitted for liquor analysis. To prevent any further precipitation, 10 mL of a sodium gluconate solution (400 g/L) is added to the remaining slurry and mixed well. The solids are collected by vacuum filtration and are thoroughly washed with hot deionized water and dried at 110° C. The particle size distribution and specific surface area are determined on a Malvern Particle Sizer, which is well known in the art. The particle size distribution is given by three quantiles, d(0.1), d(0.5) and d(0.9). These represent the particle size at which the total particle volume (or mass) is less than about 10%, 50% and 90% respectively.

Example 1

Performance of Butylphenol Formaldehyde Resin Formulations

A butylphenol formaldehyde resin obtained from commercial sources was evaluated for coarsening effects. The resin was formed under acidic conditions (where L=—CH$_2$—), with excess butylphenol. Two formulations comprising the resin were prepared:

Formulation A: butylphenol formaldehyde resin formed under acidic conditions, dispersed in an ethoxylated and propoxylated ether at a concentration of 100 g/L; and Formulation A*: butylphenol formaldehyde resin formed under acidic conditions, dispersed in kerosene at a concentration of 50 g/L.

Tables 1 and 2 show the effects of the butylphenol aldehyde formulations on particle size of Bayer aluminum hydroxide at 72° C. and 68° C., respectively. The particle size distribution is given by the three quantiles, d(0.1), d(0.5) and d(0.9). Thus, 10%, 50% and 90%, respectively, of the total particle volume (or mass) is less than the size given in the tables. The d(0.5) is just the medium size. The percent (%) increase over the control quantile particle size is the difference between the quantiles particle sizes obtained in the tests with a crystal growth modifier and control divided by the control quantile particle size. As a point of reference, the increase in particle size afforded by an existing commercial crystal growth modifier is also listed in Tables 1 and 2. The existing commercial crystal growth modifier incorporates fatty acids with chains of greater than ten carbons, and is referred to herein as the "Incumbent."

The results demonstrate the extreme coarsening effect of the butylphenol formaldehyde resin. In particular, the butylphenol formaldehyde formulations exhibited a marked improved performance over not only the undosed control samples, but also the existing incubment, which is generally considered a highly effective crystal growth modifier.

It is to be understood that the level of coarsening for each formulation has an optimum dosage, with respect to surface area coverage. Any increase in the dosage above this point may reduce the effectiveness of the additive.

TABLE 1

| Example | Dose (mg/m²) | Quantile Particle Size, μm | | | % Increase in Mean of Control Quantile Particle Size | | |
|---|---|---|---|---|---|---|---|
| | | d (0.1) | d (0.5) | d (0.9) | d (0.1) | d (0.5) | d (0.9) |
| Control 1 | — | 47 | 76 | 124 | | | |
| Control 2 | — | 47 | 78 | 126 | | | |
| Average | | 47 | 77 | 125 | | | |
| Formulation A | 2 | 57 | 95 | 155 | 21 | 23 | 24 |
| Formulation A | 4 | 56 | 92 | 150 | 19 | 19 | 20 |
| Control 3 | — | 35 | 59 | 98 | | | |
| Control 4 | — | 37 | 61 | 96 | | | |
| Average | | 36 | 60 | 97 | | | |
| Incumbent | 2 | 40 | 67 | 109 | 11 | 12 | 12 |
| Incumbent | 4 | 41 | 69 | 112 | 14 | 15 | 15 |
| Formulation A | 2 | 44 | 73 | 117 | 22 | 21 | 21 |
| Formulation A | 4 | 43 | 72 | 116 | 20 | 19 | 20 |
| Formulation A* | 2 | 43 | 72 | 116 | 20 | 18 | 20 |
| Formulation A* | 4 | 41 | 69 | 113 | 14 | 15 | 16 |

TABLE 2

| Example | Dose (mg/m²) | Quantile Particle Size, μm | | | % Increase in Mean of Control Quantile Particle Size | | |
|---|---|---|---|---|---|---|---|
| | | d (0.1) | d (0.5) | d (0.9) | d (0.1) | d (0.5) | d (0.9) |
| Control 1 | — | 45 | 73 | 115 | | | |
| Control 2 | — | 43 | 72 | 119 | | | |
| Control 3 | — | 45 | 73 | 116 | | | |
| Average | | 44 | 73 | 117 | | | |
| Incumbent | 1 | 47 | 75 | 118 | 7 | 3 | 1 |
| Incumbent | 3 | 48 | 78 | 125 | 9 | 7 | 7 |
| Incumbent | 5 | 50 | 81 | 128 | 14 | 11 | 9 |
| Formulation A | 1 | 53 | 85 | 134 | 20 | 16 | 15 |
| Formulation A | 3 | 57 | 92 | 144 | 30 | 26 | 23 |
| Formulation A | 5 | 56 | 89 | 140 | 27 | 22 | 20 |

Example 2

Performance of Phenolic-Aldehyde Resin Formulations

Additional phenolic-aldehyde resins were evaluated for coarsening effects. The resins were formed under acidic conditions (wherein L=—CH$_2$—) or under basic conditions (where L=—O—CH$_2$—). The following formulations were prepared:

Formulation A: butylphenol formaldehyde resin formed under acidic conditions with excess butylphenol, solvated in an ethoxylated and propoxylated ether at a concentration of 100 g/L;

Formulation A*: butylphenol formaldehyde resin formed under acidic conditions with excess butylphenol, solvated in kerosene at a concentration of 50 g/L;

Formulation B: resorcinol formaldehyde resin dissolved in a 15 g/L NaOH solution at a concentration of 100 g/L;

Formulation C: butylphenol formaldehyde resin formed under alkaline conditions, with a large excess of formaldehyde, solvated in an ethoxylated and propoxylated alkyl ether at a concentration of 100 g/L;

Formulation C*: butylphenol formaldehyde resin formed under alkaline conditions, with a large excess of formaldehyde, solvated in kerosene at a concentration of 25 g/L;

Formulation D: phenol formaldehyde resin formed under acidic conditions, with excess phenol, solvated in an ethoxylated and propoxylated alkyl ether at a concentration of 25 g/L;

Formulation E: cresol formaldehyde resin, formed under alkaline conditions, with a large excess of formaldehyde, supplied as a solution in propylene glycol monomethyl ether, n-butanol, and isobutanol, at a concentration of 50 wt %; and Formulation F: octylphenol formaldehyde resin formed under acidic conditions, with excess octylphenol, solvated in kerosene at a concentration of 50 g/L.

Tables 3 and 4 show the effects of the formulations on particle size of Bayer aluminum hydroxide at 72° C. and 68° C., respectively. The particle size distribution is given by the three quantiles, d(0.1), d(0.5) and d(0.9). Thus, 10%, 50% and 90%, respectively, of the total particle volume (or mass) is less than the size given in the tables. The d(0.5) is just the medium size. The percent (%) increase over the control quantile particle size is the difference between the quantiles particle sizes obtained in the tests with a crystal growth modifier and control divided by the control quantile particle size. As a point of reference, the increase in particle size afforded by an existing commercial crystal growth modifier is also listed in Tables 3 and 4. The existing commercial crystal growth modifier incorporates fatty acids with chains of greater than ten carbons, and is referred to herein as the "Incumbent."

The results demonstrate the extreme coarsening effect of the phenolic-aldehyde resins. In particular, the resin formulations exhibited a marked improved performance over not only the undosed control samples, but also the existing incubment, which is generally considered a highly effective crystal growth modifier.

It is to be understood that the level of coarsening for each formulation has an optimum dosage, with respect to surface area coverage. Any increase in the dosage above this point may reduce the effectiveness of the additive.

TABLE 3

| Example | Dose (mg/m²) | Quantile Particle Size, μm | | | % Increase in Mean of Control Quantile Particle Size | | |
|---|---|---|---|---|---|---|---|
| | | d (0.1) | d (0.5) | d (0.9) | d (0.1) | d (0.5) | d (0.9) |
| Control 1 | — | 47 | 76 | 124 | | | |
| Control 2 | — | 47 | 78 | 126 | | | |
| Average | | 47 | 77 | 125 | | | |
| Formulation A | 2 | 57 | 95 | 155 | 21 | 23 | 24 |

TABLE 3-continued

| Example | Dose (mg/m²) | Quantile Particle Size, μm d(0.1) | d(0.5) | d(0.9) | % Increase in Mean of Control Quantile Particle Size d(0.1) | d(0.5) | d(0.9) |
|---|---|---|---|---|---|---|---|
| Formulation A | 4 | 56 | 92 | 150 | 19 | 19 | 20 |
| Formulation B | 2 | 48 | 79 | 128 | 2 | 3 | 2 |
| Formulation B | 4 | 49 | 80 | 129 | 4 | 4 | 3 |
| Formulation C | 2 | 56 | 93 | 152 | 19 | 21 | 22 |
| Formulation C | 4 | 54 | 90 | 146 | 15 | 17 | 17 |
| Control 3 | — | 35 | 59 | 98 | | | |
| Control 4 | — | 37 | 61 | 96 | | | |
| Average | | 36 | 60 | 97 | | | |
| Incumbent | 2 | 40 | 67 | 109 | 11 | 12 | 12 |
| Incumbent | 4 | 41 | 69 | 112 | 14 | 15 | 15 |
| Formulation A | 2 | 44 | 73 | 117 | 22 | 21 | 21 |
| Formulation A | 4 | 43 | 72 | 116 | 20 | 19 | 20 |
| Formulation A* | 2 | 43 | 72 | 116 | 20 | 18 | 20 |
| Formulation A* | 4 | 41 | 69 | 113 | 14 | 15 | 16 |
| Formulation C* | 2 | 42 | 71 | 116 | 17 | 18 | 20 |
| Formulation C* | 4 | 41 | 70 | 114 | 14 | 17 | 18 |
| Formulation D | 2 | 36 | 58 | 96 | 0 | −2 | −1 |
| Formulation D | 4 | 36 | 58 | 95 | 0 | −2 | −2 |
| Formulation E | 2 | 38 | 63 | 103 | 6 | 5 | 6 |
| Formulation E | 4 | 37 | 62 | 100 | 3 | 3 | 3 |
| Formulation F | 2 | 40 | 66 | 108 | 11 | 10 | 8 |
| Formulation F | 4 | 38 | 63 | 105 | 6 | 5 | 5 |

TABLE 4

| Example | Dose (mg/m²) | Quantile Particle Size, μm d(0.1) | d(0.5) | d(0.9) | % Increase in Mean of Control Quantile Particle Size d(0.1) | d(0.5) | d(0.9) |
|---|---|---|---|---|---|---|---|
| Control 1 | | 45 | 73 | 115 | | | |
| Control 2 | | 43 | 72 | 119 | | | |
| Control 3 | | 45 | 73 | 116 | | | |
| Average | | 44 | 73 | 117 | | | |
| Incumbent | 1 | 47 | 75 | 118 | 7 | 3 | 1 |
| Incumbent | 3 | 48 | 78 | 125 | 9 | 7 | 7 |
| Incumbent | 5 | 50 | 81 | 128 | 14 | 11 | 9 |
| Formulation A | 1 | 53 | 85 | 134 | 20 | 16 | 15 |
| Formulation A | 3 | 57 | 92 | 144 | 30 | 26 | 23 |
| Formulation A | 5 | 56 | 89 | 140 | 27 | 22 | 20 |
| Formulation C | 1 | 53 | 84 | 133 | 20 | 15 | 14 |
| Formulation C | 3 | 54 | 86 | 135 | 23 | 18 | 15 |
| Formulation C | 5 | 55 | 89 | 139 | 25 | 22 | 19 |

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. Any and all patents, patent applications, scientific papers, and other references cited in this application, as well as any references cited therein, are hereby incorporated by reference in their entirety.

What is claimed is:

1. A method of increasing the particle size of aluminum hydroxide crystals precipitated from a Bayer process liquor, the method comprising:
   adding to the Bayer process liquor a composition comprising a phenolic-aldehyde condensate; and
   recovering aluminum hydroxide crystals precipitated from the Bayer process liquor.

2. The method of claim 1, wherein the phenolic-aldehyde condensate comprises repeating units of formula (I),

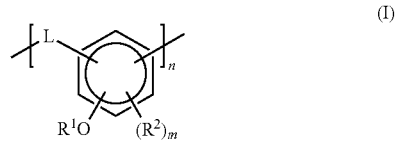

(I)

wherein,
R¹, at each occurrence, is independently selected from the group consisting of hydrogen, alkyl, alkenyl, alkynyl, aryl, heteroaryl, heterocyclyl, and cycloalkyl;
R², at each occurrence, is independently selected from the group consisting of alkyl, alkenyl, alkynyl, aryl, heteroaryl, heterocyclyl, cycloalkyl, halogen, cyano, nitro, and —OR³;
R³, at each occurrence, is independently selected from the group consisting of hydrogen, alkyl, alkenyl, alkynyl, aryl, heteroaryl, heterocyclyl, and cycloalkyl;
L is —C(Rᵃ)(Rᵇ)— or —O—C(Rᶜ)(Rᵈ)—;
Rᵃ, Rᵇ, Rᶜ, and Rᵈ are, at each occurrence, independently selected from the group consisting of hydrogen, alkyl, alkenyl, alkynyl, aryl, heteroaryl, heterocyclyl, and cycloalkyl;
m, at each occurrence, is an integer independently selected from the group consisting of 0, 1, 2, and 3; and
n is greater than 1;
wherein said alkyl, alkenyl, alkynyl, aryl, heteroaryl, heterocyclyl, and cycloalkyl are each independently, at each occurrence, substituted or unsubstituted with one or more suitable substituents.

3. The method of claim 2, wherein the phenolic-aldehyde repeating units have formula (I-a),

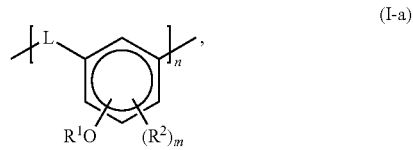

(I-a)

wherein R¹, R², L, m, and n are as defined above.

4. The method of claim 3, wherein the phenolic-aldehyde repeating units have formula (I-b),

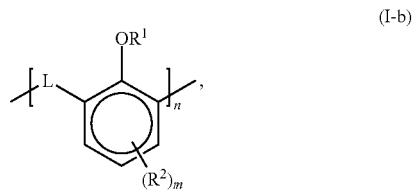

(I-b)

wherein R¹, R², L, m, and n are as defined above.

5. The method of claim 4, wherein the phenolic-aldehyde repeating units have formula (I-c),

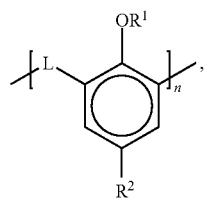
(I-c)

wherein $R^1$, $R^2$, L, and n are as defined above.

6. The method of claim 5, wherein
$R^1$ is hydrogen at each occurrence; and
$R^2$, at each occurrence, is independently selected from —OH and $C_1$-$C_8$ substituted or unsubstituted alkyl.

7. The method of claim 6, wherein L is —$CH_2$— at each occurrence.

8. The method of claim 6, wherein L is —O—$CH_2$— at each occurrence.

9. The method of claim 1, wherein the phenolic-aldehyde condensate has formula (II),

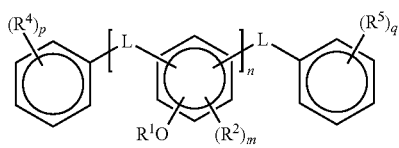
(II)

wherein,
$R^1$, at each occurrence, is independently selected from the group consisting of hydrogen, alkyl, alkenyl, alkynyl, aryl, heteroaryl, heterocyclyl, and cycloalkyl;
$R^2$, at each occurrence, is independently selected from the group consisting of alkyl, alkenyl, alkynyl, aryl, heteroaryl, heterocyclyl, cycloalkyl, halogen, cyano, nitro, and —$OR^3$;
$R^3$, at each occurrence, is independently selected from the group consisting of hydrogen, alkyl, alkenyl, alkynyl, aryl, heteroaryl, heterocyclyl, and cycloalkyl;
$R^4$, at each occurrence, is independently selected from the group consisting of alkyl, alkenyl, alkynyl, aryl, heteroaryl, heterocyclyl, cycloalkyl, halogen, cyano, nitro, and —$OR^6$;
$R^5$, at each occurrence, is independently selected from the group consisting of alkyl, alkenyl, alkynyl, aryl, heteroaryl, heterocyclyl, cycloalkyl, halogen, cyano, nitro, and —$OR^7$;
$R^6$ and $R^7$, at each occurrence, are each independently selected from the group consisting of hydrogen, alkyl, alkenyl, alkynyl, aryl, heteroaryl, heterocyclyl, and cycloalkyl;
L is —$C(R^a)(R^b)$— or —O—$C(R^c)(R^d)$—;
$R^a$, $R^b$, $R^c$, and $R^d$, at each occurrence, are each independently selected from the group consisting of hydrogen, alkyl, alkenyl, alkynyl, aryl, heteroaryl, heterocyclyl, and cycloalkyl;
m, at each occurrence, is an integer independently selected from the group consisting of 0, 1, 2, and 3;
n is greater than 1;
p is 1, 2, 3, 4, or 5; and
q is 1, 2, 3, 4, or 5;
wherein said alkyl, alkenyl, alkynyl, aryl, heteroaryl, heterocyclyl, and cycloalkyl are each independently, at each occurrence, substituted or unsubstituted with one or more suitable substituents.

10. The method of claim 9, wherein the phenolic-aldehyde condensate has formula (II-a),

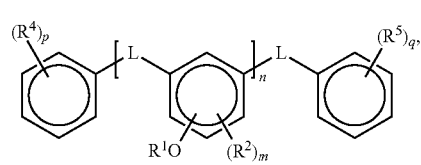
(II-a)

wherein $R^1$, $R^2$, $R^4$, $R^5$, L, m, n, p, and q are as defined above.

11. The method of claim 10, wherein the phenolic-aldehyde condensate has formula (II-b),

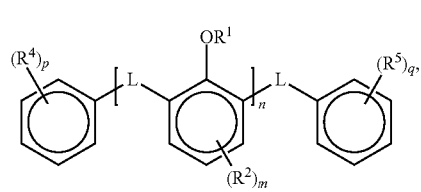
(II-b)

wherein $R^1$, $R^2$, $R^4$, $R^5$, L, m, n, p, and q are as defined above.

12. The method of claim 11, wherein the phenolic-aldehyde condensate has formula (II-c),

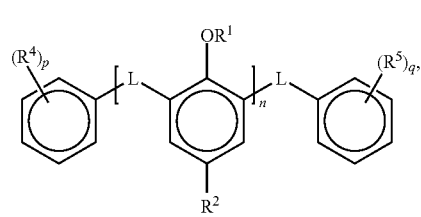
(II-c)

wherein $R^1$, $R^2$, $R^4$, $R^5$, L, n, p, and q are as defined above.

13. The method of claim 12, wherein
$R^1$ is hydrogen at each occurrence;
$R^2$, at each occurrence, is independently selected from —OH and $C_1$-$C_8$ substituted or unsubstituted alkyl;
p is 1 or 2 wherein at least one $R^4$ is —OH and the other optional $R^4$ is selected from —OH and $C_1$-$C_8$ substituted or unsubstituted alkyl; and
q is 1 or 2 wherein at least one $R^5$ is —OH and the other optional $R^5$ is selected from —OH and $C_1$-$C_8$ substituted or unsubstituted alkyl.

14. The method of claim 13, wherein L is —$CH_2$— at each occurrence.

15. The method of claim 13, wherein L is —O—$CH_2$— at each occurrence.

16. The method of claim 1, wherein the phenolic-aldehyde condensate is selected from the group consisting of:
a butylphenol formaldehyde resin formed under acidic conditions;

a butylphenol formaldehyde resin formed under basic conditions;
a resorcinol formaldehyde resin formed under acidic conditions;
a resorcinol formaldehyde resin formed under basic conditions;
a phenol formaldehyde resin formed under acidic conditions;
a phenol formaldehyde resin formed under basic conditions;
a cresol formaldehyde resin formed under acidic conditions;
a cresol formaldehyde resin formed under basic conditions;
an octylphenol formaldehyde resin formed under acidic conditions; and
an octylphenol formaldehyde resin formed under basic conditions.

17. The method of claim 1, wherein the composition further comprises a solvent selected from the group consisting of ethoxylated and propoxylated alkyl ethers or alcohols, fatty acid esters, low aromatic hydrocarbon oils, kerosene, heavy aromatic naphtha, propylene glycol monomethyl ether, n-butanol, isobutanol, and combinations thereof.

18. The method of claim 1, wherein the composition is selected from the group consisting of:
a composition of a butylphenol formaldehyde resin formed under acidic conditions, and an ethoxylated and propoxylated alkyl ether;
a composition of a butylphenol formaldehyde resin formed under acidic conditions, and kerosene;
a composition of a butylphenol formaldehyde resin formed under basic conditions, and an ethoxylated and propoxylated alkyl ether;
a composition of a butylphenol formaldehyde resin formed under basic conditions, and kerosene;
a composition of a resorcinol formaldehyde resin, and a sodium hydroxide solution;
a composition of a phenol formaldehyde resin formed under acidic conditions, and an ethoxylated and propoxylated alkyl ether;
a composition of a cresol formaldehyde resin formed under basic conditions, propylene glycol monomethyl ether, n-butanol, and isobutanol; and
a composition of an octylphenol formaldehyde resin formed under acidic conditions, and kerosene.

19. The method of claim 1, wherein at least half of the recovered aluminum hydroxide crystals by weight exceed 44-45 microns in size.

20. The method of claim 1, wherein the adding of the composition comprising a phenolic-aldehyde condensate provides an increase of control quantile size of at least 20% mean of control quantile particle size wherein the percent increase over the control quantile particle size is the difference between the quantile particle sizes obtained in the tests with a crystal growth modifier and with a control divided by the control quantile particle size.

21. The method of claim 1, wherein the phenolic-aldehyde condensate is a butylphenol formaldehyde resin formed under acidic conditions.

22. The method of claim 1, wherein the phenolic-aldehyde condensate is a butylphenol formaldehyde resin formed under basic conditions.

23. The method of claim 21, wherein the composition comprising a phenolic-aldehyde condensate further comprises an ethoxylated and propoxylated alkyl ether.

24. The method of claim 22, wherein the composition comprising a phenolic-aldehyde condensate further comprises an ethoxylated and propoxylated alkyl ether.

* * * * *